United States Patent
Maye

(10) Patent No.: US 11,103,923 B2
(45) Date of Patent: Aug. 31, 2021

(54) COMPOSITIONS OF NANOPARTICLES WITH RADIAL GRADIENTS AND METHODS OF USE THEREOF

(71) Applicant: Mathew Maye, Binghamton, NY (US)

(72) Inventor: Mathew Maye, Binghamton, NY (US)

(73) Assignee: Syracuse University, Syracuse, NY (US)

( * ) Notice: Subject to any disclaimer, the term of this patent is extended or adjusted under 35 U.S.C. 154(b) by 307 days.

(21) Appl. No.: 15/776,879

(22) PCT Filed: Nov. 18, 2016

(86) PCT No.: PCT/US2016/062666
§ 371 (c)(1),
(2) Date: May 17, 2018

(87) PCT Pub. No.: WO2017/087744
PCT Pub. Date: May 26, 2017

(65) Prior Publication Data
US 2018/0326479 A1   Nov. 15, 2018

Related U.S. Application Data

(60) Provisional application No. 62/257,665, filed on Nov. 19, 2015.

(51) Int. Cl.
B32B 5/16 (2006.01)
B22F 1/02 (2006.01)
(Continued)

(52) U.S. Cl.
CPC ............ B22F 1/025 (2013.01); B22F 1/0018 (2013.01); B22F 1/0085 (2013.01); B22F 7/00 (2013.01);
(Continued)

(58) Field of Classification Search
CPC .................. C23C 28/02; C23C 28/048; Y10T 428/12021; Y10T 428/12028; Y10T 428/12181
(Continued)

(56) References Cited

U.S. PATENT DOCUMENTS 8,142,892 B2  3/2012 Rida
9,139,430 B2  9/2015 Qian et al.
(Continued)

FOREIGN PATENT DOCUMENTS

JP    2003055703 A   5/2005

OTHER PUBLICATIONS

Kang et al., "Multimetallic Core/Interlayer/Shell Nanostructures as Advanced Electrocatalysts", Nano Lett. 2014, 14, 6361-6367 (Year: 2014).*

(Continued)

*Primary Examiner* — Hoa (Holly) Le
(74) *Attorney, Agent, or Firm* — Bond Schoeneck and King PLLC; David Nocilly

(57) ABSTRACT

A nanoparticle with tunable radial gradients of compositions extending from the center of the nanoparticles. The nature of the gradient preserves the metallic state of the nanoparticles, the diffusion of the constituents, and the oxidation of the interface. The gradients can be purposely varied to allow for specific applications in fields ranging from corrosion, magnetics, information technology, imaging, electromagnetic absorption, coating technologies, and immuno-precipitation. The nanoparticles can be easily used to advance many areas of industry, technology, and life sciences.

10 Claims, 27 Drawing Sheets

(51) Int. Cl.
- *B22F 1/00* (2006.01)
- *B82Y 30/00* (2011.01)
- *B82Y 40/00* (2011.01)
- *C22C 38/08* (2006.01)
- *C22C 38/10* (2006.01)
- *C22C 32/00* (2006.01)
- *C22C 38/00* (2006.01)
- *B22F 7/02* (2006.01)
- *B22F 7/00* (2006.01)

(52) U.S. Cl.
CPC ............... *B22F 7/02* (2013.01); *B82Y 30/00* (2013.01); *B82Y 40/00* (2013.01); *C22C 32/0094* (2013.01); *C22C 38/00* (2013.01); *C22C 38/08* (2013.01); *C22C 38/10* (2013.01); *B22F 2301/35* (2013.01); *B22F 2999/00* (2013.01); *C22C 2202/02* (2013.01); *Y10T 428/12021* (2015.01)

(58) Field of Classification Search
USPC .......................................... 428/547, 548, 570
See application file for complete search history.

(56) References Cited

U.S. PATENT DOCUMENTS

| 9,604,281 B2 | 3/2017 | Maye et al. |
| 2008/0057001 A1 | 3/2008 | Xiao-Dong |
| 2013/0078510 A1 | 3/2013 | Reynolds et al. |
| 2016/0288212 A1* | 10/2016 | Millstone ............... B82B 1/008 |

OTHER PUBLICATIONS (Gao, J. et al.) FePt@CoS2 Yolk-Shell Nanocrystals as a Potent Agent to Kill HeLa Cells, Journal of the American Chemical Society, Jan. 11, 2007, vol. 129 No. 5, pp. 1428-1431, S1, S3.

International Search Report and Written Opinion Form PCT/ISA/220, International Application No. PCT/US16/62666, p. 1-6, dated Jan. 30, 2017.

"Multimetallic Core/Interlayer/Shell Nanostructures as Advanced Electrocatalysts", Yijin Kang, et al., Nano letters, pp. 6361 6367, Oct. 2014).

JP Notice of Refusal, Dated Jun. 21, 2021, Application No. 2018-545562, pp. 1-23.

* cited by examiner

COMPOSITIONS OF NANOPARTICLES WITH RADIAL GRADIENTS AND METHODS OF USE THEREOF

CROSS-REFERENCE TO RELATED APPLICATIONS

The present application claims priority to U.S. Provisional No. 62/257,665, filed on Nov. 19, 2015.

STATEMENT REGARDING FEDERALLY SPONSORED RESEARCH

This invention was made with government support under Grant No. 1410569, awarded by the National Science Foundation (NSF). The government has certain rights in the invention.

BACKGROUND OF THE INVENTION

1. Field of the Invention

The present invention relates to the composition of nanoparticles upon which stability against oxidation is dramatically improved, and, more specifically, a composition and microstructure of nanomaterial that consists of a radial composition change or alloy gradient that can be tuned to facilitate controlled atom diffusion, oxide growth, size and shape change, and reactivity.

2. Description of the Related Art

Controlling the oxidation of metal surfaces is of as great importance today as it was a half century ago when discoveries related to oxidation theory, diffusion rates, and phase diagrams led to advances in super alloys, shape memory alloys, and stainless steels. Today, research at the interface of metals and metal oxide focuses on technologically important thin-films, and at the optimization of nanoscale parameters at which the metal oxide growth occurs. This is especially true for transition metal nanoparticles, where the bulk of research focuses solely on metal oxides. This is due primarily due to the ease upon which transition metals oxidize, which is even truer for nanoscale metals. Thus one technological hurdle that must be overcome is developing new compositions of nanoparticles that have some intrinsic ability to resist oxidation designed into their synthesis. If such a nanoparticle was available today, great advances in thin-film technology, magnetic fluids, magnetic imaging, and corrosion resistive remediation would be possible. The art described herein pertains to a discovered nanoparticle that has a radial composition gradient (a composition change as a function of distance from the center of the nanoparticle outward) variation that takes advantage of alloy properties and subsequent variations in oxidation tendencies. That is to say, the intricate differences in self-diffusion rates between metals, and the oxidation rates in those metals, is used as a synthetic tool to create the novel compositions and gradients. The oxidation of a metal surface is well-understood using Cabrera-Mott (CM) theory, and at times. Take for example self-diffusion in metallic iron ($\alpha$-Fe), metallic chromium ($\alpha$-Cr), and metallic nickel (Ni), see FIG. 1a. Where X, X, and X. Interestingly, when a surface is only partially oxidized, such oxidation can increase, as in the case of Fe in $Fe_2O_3$, or decrease, in the case of Ni in NiO, see FIG. 1b. Moreover, oxidation rates depend on particle size, the results of which can lead to not only different expected oxide thicknesses at a nanoparticle interface, but also induce different metal diffusion through the oxide, which is often at a much different rate than oxide diffusion. This divergent diffusion trend leads to Kirkendall effects playing a major role at nano interfaces, where unequal diffusion rates at a metal-metal or alloy-alloy interface cause defect concentration increases (i.e. empty void formations, or hollow nanoparticles). Furthermore, combination with additional synthetic controls, like the introduction of coordinating ligands, variation in temperatures, pressures, and external stimuli, can further alter and control the composition gradient of the nanoparticle.

BRIEF SUMMARY OF THE INVENTION

The present invention comprises a novel composition of nanoparticle that consists of a radial composition gradient of multiple; metals, alloys, voids, oxides, or non-metals. The gradients consist of transition metals and oxides, however it is understood that additional noble metals, semiconductors, or ionic lattices could be used. In the present embodiment, the gradient is iron rich at the center, where the iron is in it's zero-oxidation state (i.e., metallic iron), and composition can change gradually from nickel in it's zero-oxidation state (i.e., metallic), to chromium, in it's zero-oxidation state (i.e. metallic), or vice-versa, or combined with additional metals, like cobalt, vanadium, manganese, tungsten, or any other suitable metal. Moreover, the gradient can also consist of mixtures of chromium and nickel in zero-oxidation states (i.e. metallic alloys), which can be combined with additional metals, like cobalt, vanadium, manganese, tungsten, or any other suitable metal. In addition, chalcogens may be introduced in the form of an oxygen anion (i.e., $O^{2-}$), or sulfur anions (i.e., $S^{2-}$) throughout the lattices where required, in the form of an oxide or sulfide. Finally, the nanoparticle gradient can be terminated with concentric domains of noble metals, like gold, silver, palladium, or platinum, or in segregated (phase separated) domains. With these compositions, the invention leads to nanoparticles with transformational performance improvements, such as in oxidation resistance, where stainless like properties and a long-term retention of the nanoscale metallic properties are preserved. Once such example is the nanoparticle's magnetism. The composition gradients described have magnetic properties that result from metallic ferromagnetic properties that result from the materials retaining a high percentage of metallic character, and not the properties characteristic of complete metal oxides of nanoparticles.

Controlling the oxidation of metal surfaces is of as great importance today as it was a half century ago when discoveries related to oxidation theory, diffusion rates, and phase diagrams led to advances in super alloys, shape memory alloys, and stainless steels. Today, research at the interface of metals and metal oxide focuses on technologically important thin-films, and at the optimization of nanoscale metal properties and performance. This is especially true for transition metal nanoparticles. While transition metals at the bulk scale can be forged and alloyed in high temperature furnaces to ensure alloying and oxidation control, one area of modern importance and that is under explored is the use of oxidation, and the intricate differences in diffusion rates between transition metals and their oxides, as a synthetic tool to manipulate nanoscale performance. The oxidation of a metal surface is well-understood using Cabrera-Mott (CM) theory, and at times, the results can be surprising to the colloidal synthetic chemist. Take for example self-diffusion in iron ($\alpha$-Fe), chromium ($\alpha$-Cr), and nickel (Ni). Iron atoms self-diffuse rapidly in a b.c.c. lattice, but diffuse slower in Ni and Cr, with diffusion in Cr being many orders of magnitude slower. Nickel atoms however self-diffuse in a f.c.c. Ni-lattice at modest rates in both Fe and Cr. Chromium on the other hand, has a slow self-diffusion rate, but diffuses orders of magnitude faster in both Fe and Ni. Interestingly, when a surface is oxidized, such diffusion can increase, as in the case of Fe in $Fe_2O_3$, or decrease, in the case of Ni in NiO. Moreover, oxidation rates depend highly on oxide thickness and type, where $O^{2-}$ anions diffuse slow in NiO and $Cr_2O_3$ oxides, but rapidly in $Fe_3O_4$, for instance. Thus, compositions of interfaces with mixed metals, oxide types, and oxides thickness can govern the flow of atoms and oxide growth, which at the nanoscale, can lead to novel behavior. This divergent diffusion trends and the ability to tailor it also leads to Kirkendall effects playing a major role at nano interfaces, particularly during oxidation. This results not only in oxidation, but often in voids being formed within the nanoparticles as a result of atom diffusion. Thus, to a synthetic materials chemist, the careful choosing of material combinations and oxidation control can lead to tuning the reaction conditions (ligand environment, oxygen pressure, annealing temperature, etc.), and thus, lead to new NP morphologies and microstructures.

The present invention involves the control of oxidation behavior at the nanoscale in order to preserve the magnetic properties of the material and also the materials ability to resist oxidation (it's stainless behavior). To achieve this, the present invention includes a "gradient nanoparticle", where the composition of the nanoparticle changes from the center radially outward to the interface. By controlling the composition along the gradient, which includes both the metal type, but also its concentration, the present invention can improve the materials performance.

As discussed above, the multi-metallic alloy nanoparticles (NPs) are an important research topic as a result of the many combinations of metals that result in unique properties that might not resemble the bulk or individual NP counterparts, such as electronic, catalytic, and optical properties. The potential applications of these materials are varied, ranging from sensors to ferro-fluids, as a result of the combination of phases in discreet nanoscale dimensions. Unique properties of bimetallic nanomaterials are achieved depending on the moiety used during preparation. For instance, $Fe_3O_4$/Au NPs have the both the magnetic properties of the Fe3O4 and plasmonic properties of the Au, as well as magnetic and catalytic bifunctionality. Alloy NPs, such as $Fe_xCo_{1-x}$ NPs, exhibit unique magnetic properties due to the combination of ferromagnetic Fe and Co. However, challenges arise in the fabrication of bimetallic NPs such as phase segregation, oxidation, and redox reactions. FeNi and FeCr alloy NPs are interesting due to interfacial oxidation and magnetic properties. When synthesized in nano-form, these NPs have attractive properties such as high saturation magnetization, low hysteresis, magnetic phase transition, high magnetic permeability, and corrosion resistance, allowing for potential applications in biomedicine, catalysis, electronics, nano-fluids, and magnetic data storage. Synthesis of FeNi alloy NPs typically involves the simultaneous decomposition of Fe and Ni precursors. Utilizing this method it is typically difficult to control composition and morphology. Oxidation of these particles results in the formation of alloy/ferrites, such as FeNi/$NiFe_2O_4$, which may affect the magnetic properties due to the formation of a magnetically dead oxide layer on the surface of the particle. Though classical Cabrera-Mott (CM) oxidation theory has been used to model and understand NP oxidation in monometallic systems, it has not yet been applied to bimetallic or multi-metallic systems, therefore, understanding the oxidation of these bimetallic FeNi NP systems via a theoretical model is of particular interest.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 1 is a schematic illustration of the gradient nanoparticle compositions and variations (a-b). A metallic nanoparticle with critical dimensions of 5-500 nm (1) and a metallic or oxide outer interface (the periphery) that may also have organic ligands or molecules attached (2), can have an internal composition gradient of $a_1$-$b_2$, where a and b represent transition metals, and where $a_1$ is compositionally rich at the center of the nanoparticle, and $b_2$ is compositionally rich at the periphery. Alternatively, any number of additional metals components (these are denoted for simplicity as $c_3$) can be present (3), and the sequence of the multi-metallic composition can be tailored in any combination (4). Whereas the composition gradient can be abrupt (a-c), the gradient can also be made with a continuously changing one $b_xc_{1-x}$ (5) where x varies as a function of radius. While shown here with two or three metallic elements, this is shown for clarity only, and the number of components, gradients, or gradient profiles are expansive, as are the number of alloys, intermetallics, and ceramics, rare-earth and non-metal crystal structures that can be utilized.

in FIG. 3) results in a v-Fe—Ni gradient composition where the center is hollow.

Figure 16:
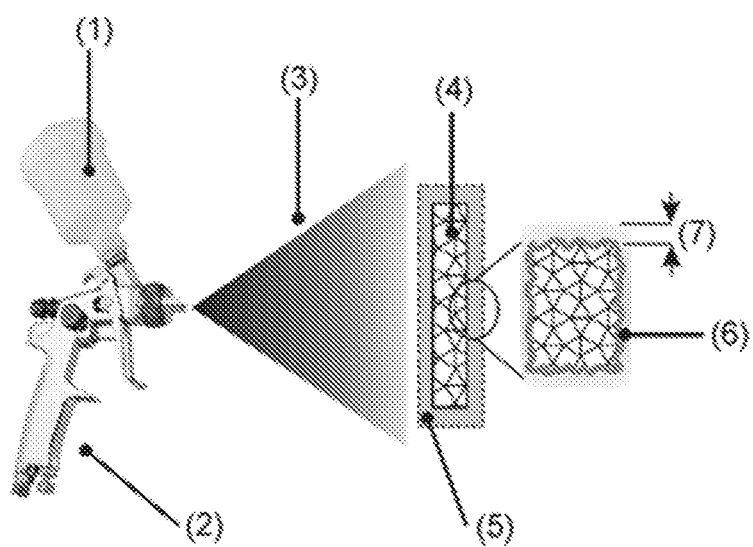

FIG. 16 is a schematic of the spray coating process. The gradient nanoparticles are dispersed in water, solvent, or in combination with binders, plastics, epoxies, or silanes (1), and applied (2) onto substrates by finely controlling deposition rate, concentrations, and coverages (3). The final substrate (4) can be metallic, magnetic, semiconductive, a non-metal, a plastic, a composite, glass, paper, or some combination thereof. The thickness of the coating (5) can thus be tailored. The gradient nanoparticles will fill in defects at the substrate surface, including passivating grain boundaries, cracks, and impurities (8). The thickness of the coating can be controlled, and can vary from 1-1000 nanometers. The final film can be further processed after applying via heat treatment, vacuum treatment, or other processing techniques (not illustrated)

Figure 15:
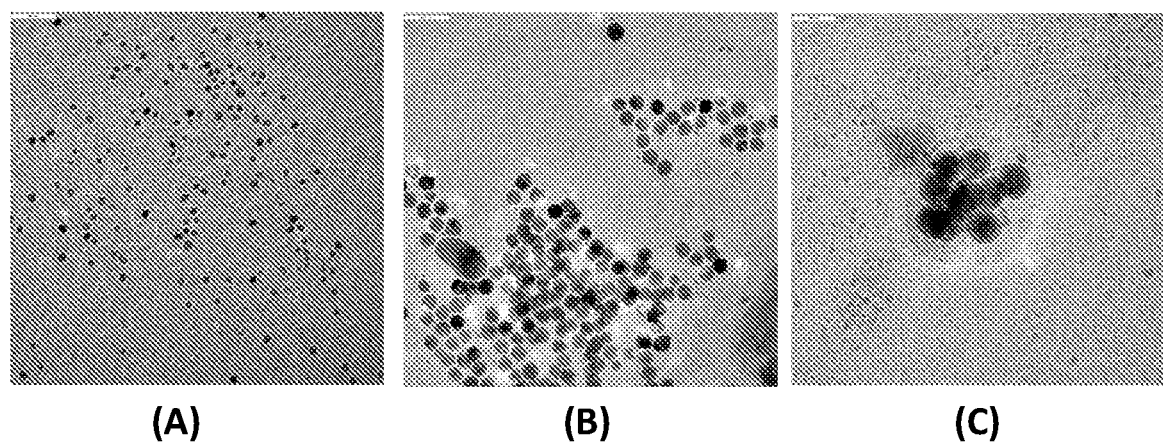
FIG. 15 is TEM micrographs of Fe—Fe$_x$Co$_{1-x}$ (A), Fe—Fe$_x$Mo$_{1-x}$ (B), and Fe—Fe$_x$Mn$_{1-x}$ (C) gradient nanoparticles. Scale bar is 50, 100, and 50 nm respectively.
Figure 17:
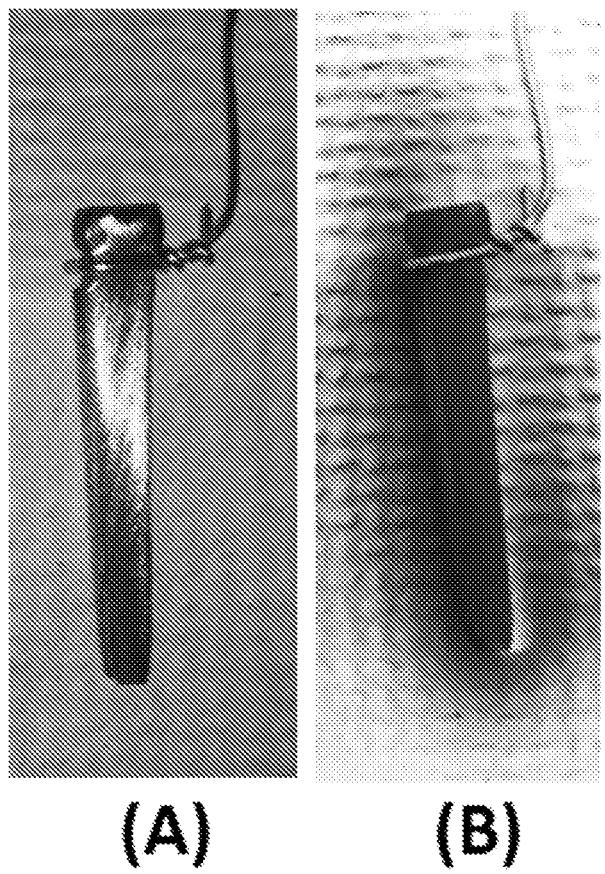

FIG. 17 is a photograph of an iron nail before (A) and after (B) spray coating with gradient nanoparticles following the approach outlined in FIG. 15. The coatings are uniform and produce a dull or matte black finish that varies depending on coating thickness (15-100,000 nanometers).

Figure 18:
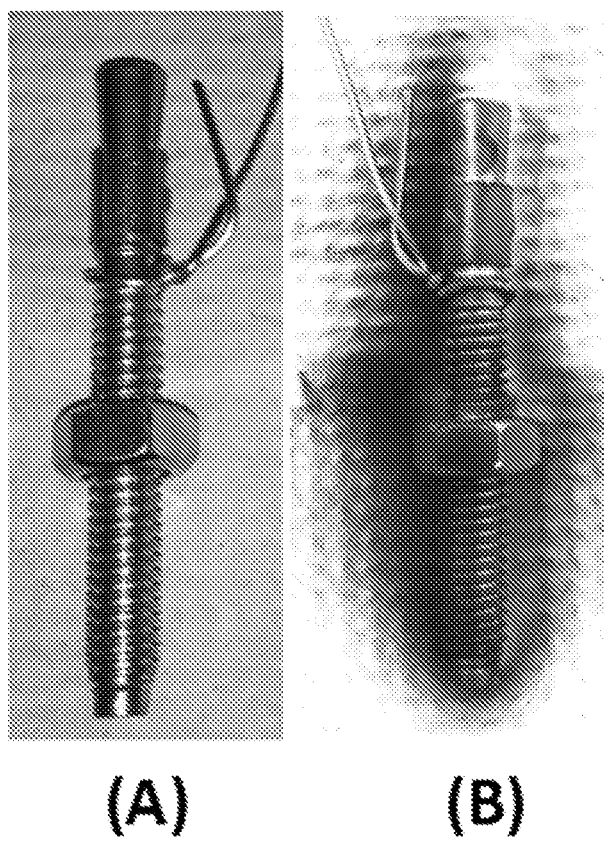

FIG. 18 is an industrial galvanized nut and bolt before (A), and after (B) spray coating with gradient nanoparticles.

Figure 19:
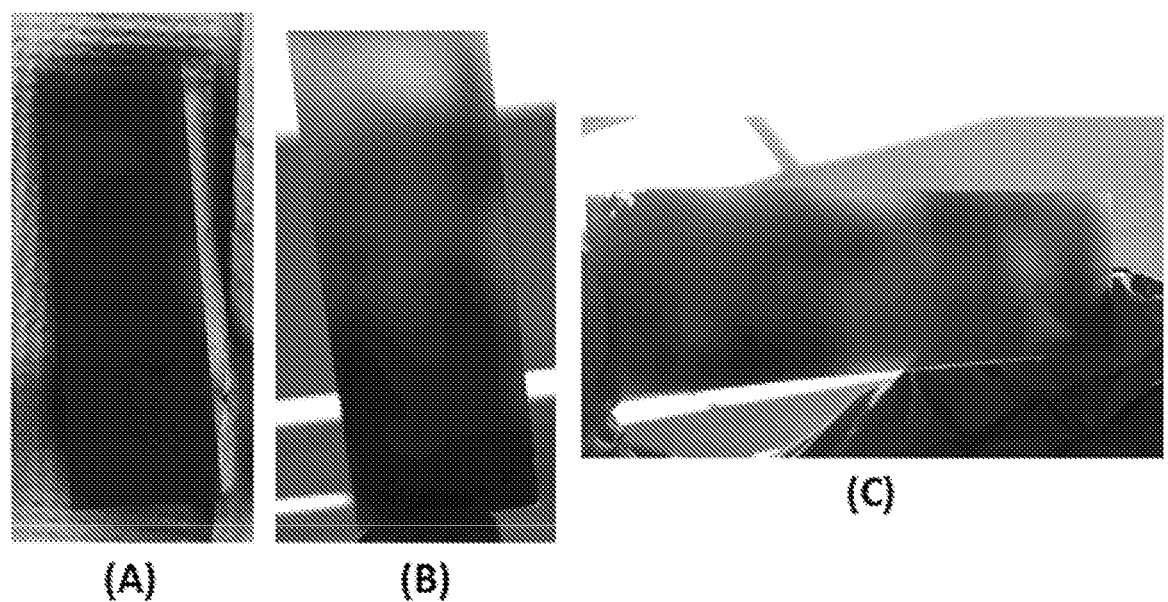

FIG. 19 is a photograph of a glass microscope slide after spray coating with gradient nanoparticles, demonstrating the ease of coating non-metal surfaces.

Figure 20:
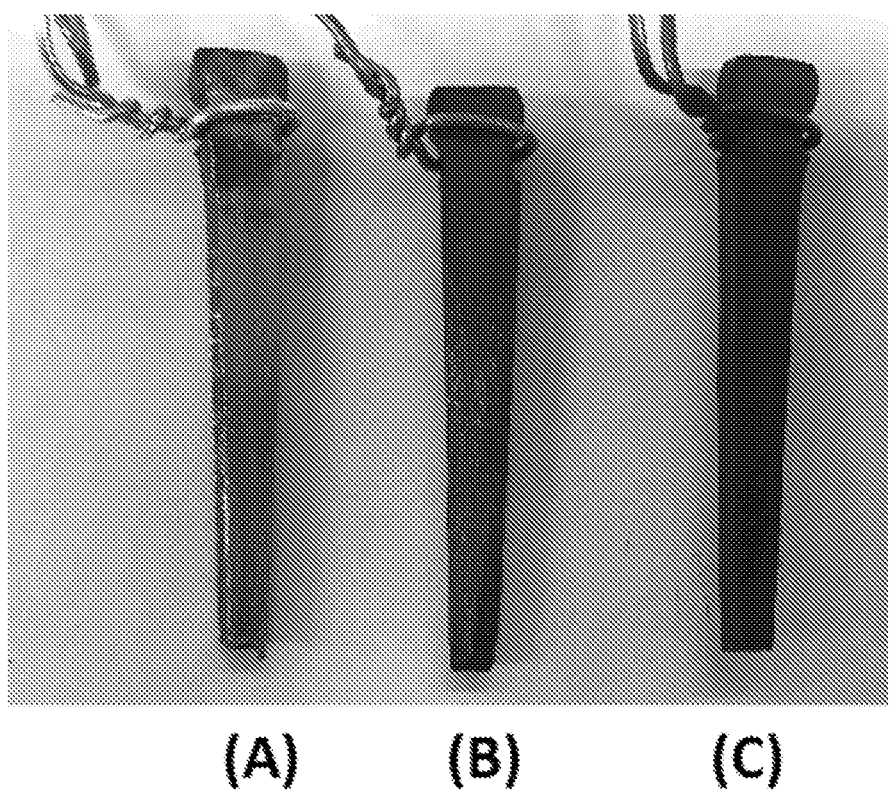

FIG. 20 is a photograph of iron nails before (A) and after (B) exposure to heating at 190° C. for 15 h. A photograph of a gradient nanoparticle coated iron nail after exposure to heating at 190° C. for 15 h (C). The bare iron nail turns a deep red color due to a thick red oxide film, whereas the gradient nanoparticle coated iron nail remains a deep matted black color, which indicates the improved corrosion resistance of the gradient-coated nail.

Figure 21:
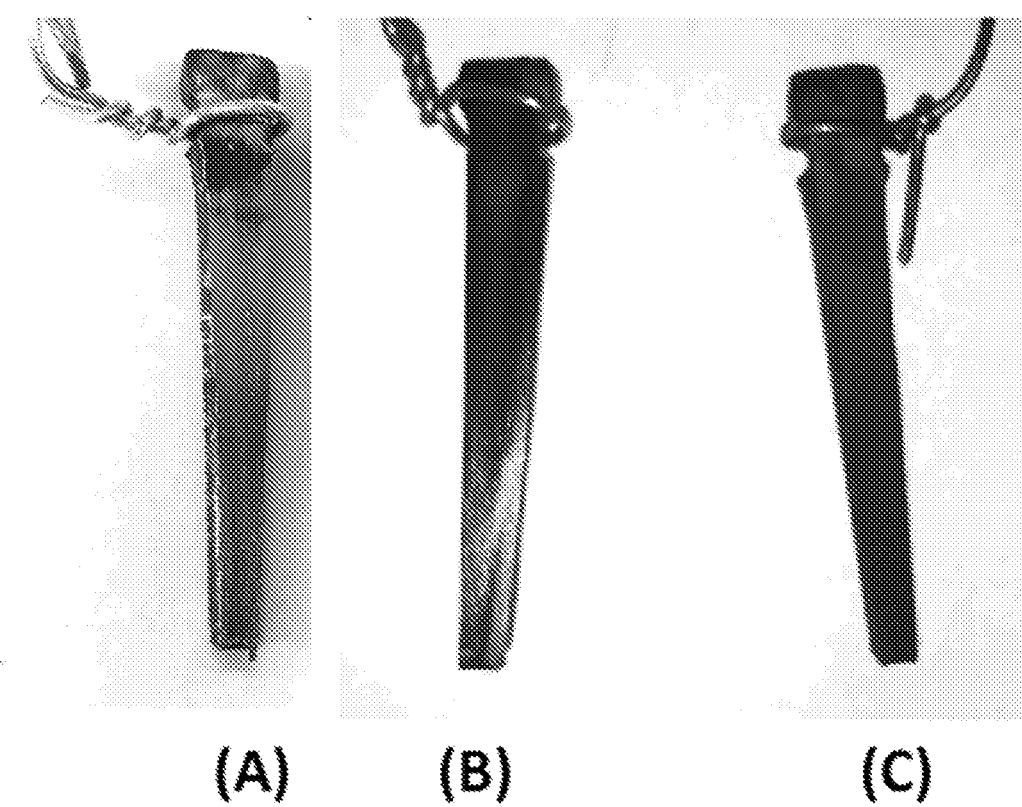

FIG. 21 is a photograph of an iron nails before (A) and after (B) exposure to heating at 190° C. for 30 h. A photograph of a gradient nanoparticle coated iron nail after exposure to heating at 190° C. for 30 h (C). The bare iron nail turns a deep purple/blue color due to a thick red oxide film, whereas the gradient nanoparticle coated iron nail remains a deep matted black color, which indicates the improved corrosion resistance of the gradient-coated nail.

Figure 22:
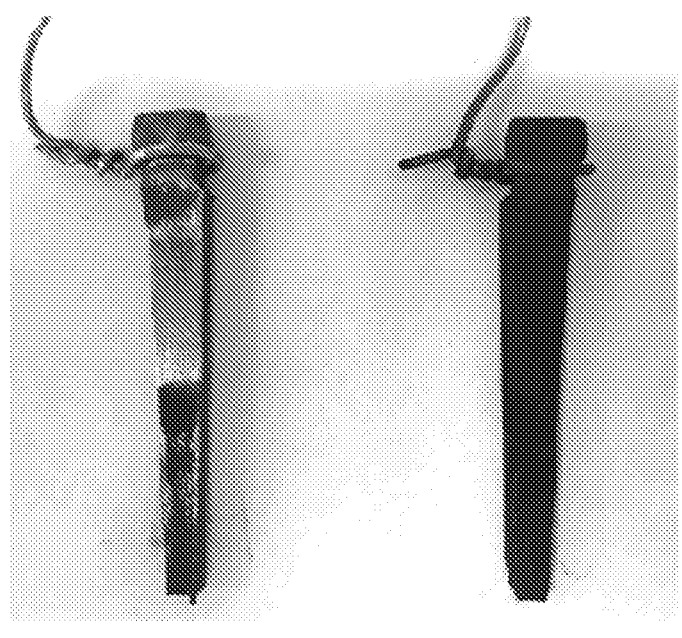

FIG. 22 is a photograph of an iron nail (A), which originated like that shown in FIG. 19A, and a gradient nanoparticle coated iron nail (B) after dipping in salt water for 14 h. The un-coated iron nail clearly shows rusting and mass loss, whereas the coated nail shows minimal change, which indicates the improved corrosion resistance of the gradient-coated nail. The water line is halfway up from the bottom of the nail.

Figure 23:
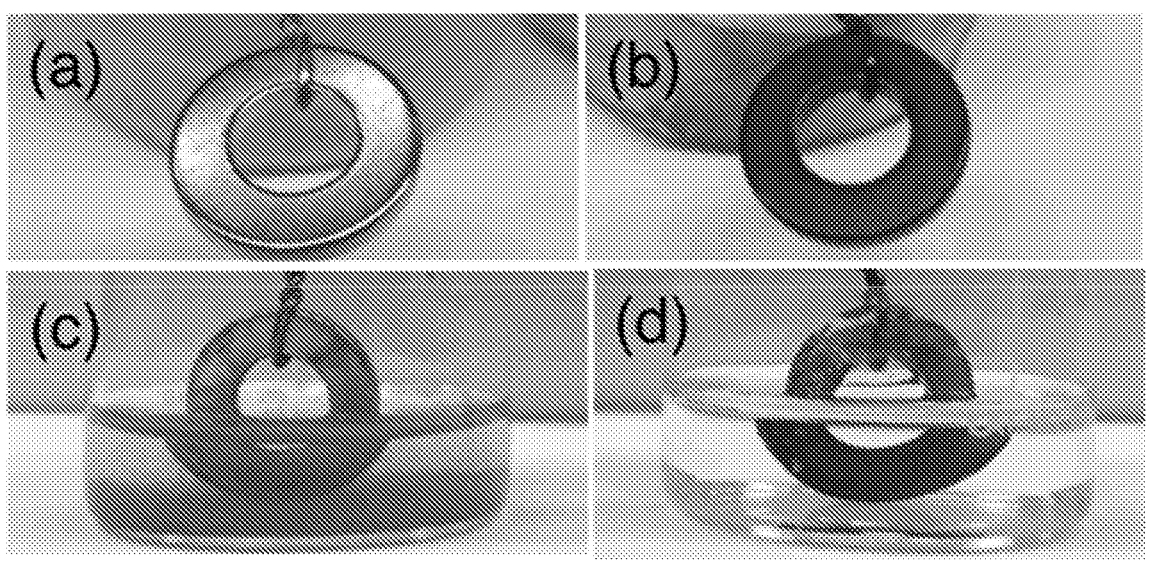

FIG. 23 is a series of photographs containing either NdFeB magnets (a), or NdFeB magnets coated with Ni—Cr$_x$Ni$_{1-x}$ gradient nanoparticles (b). The coating was applied via the methods described above. Testing the corrosion inhibition of these magnets was carried out in 5% NaCl salt solutions at 25° C. for 36 h. As shown in FIG. 23c, the un-coated NdFeB magnet shows corrosion, as is evident by the color change of the magnets surface, as well as the rusty color of the solution (c). In contrast, the gradient coated NdFeB magnet shows no corrosion and its surface still remains an unchanged and the solution does not change color, indicating that the protective gradient layer is passivating the magnets towards corrosion.

Figure 24:
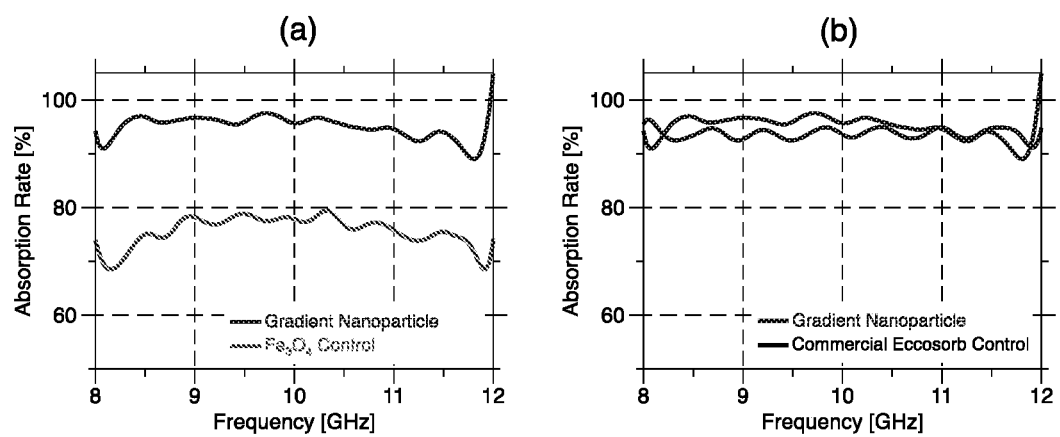

FIG. 24 is the results of electromagnetic (EM) measurements testing the absorption of 8-12 GHz frequencies by magnetic gradient nanoparticles. (a) Comparison of EM absorption properties of gradient nanoparticles compared to conventional Fe3O4 magnetic nanoparticles when loaded into elastomer supports, demonstrating superior absorption by the gradients. (b) Comparison of gradient nanoparticles to commercially available microwave absorbers (eccosorb), demonstrating similar absorption despite low loadings in gradient embedded elastomer.

Figure 25:
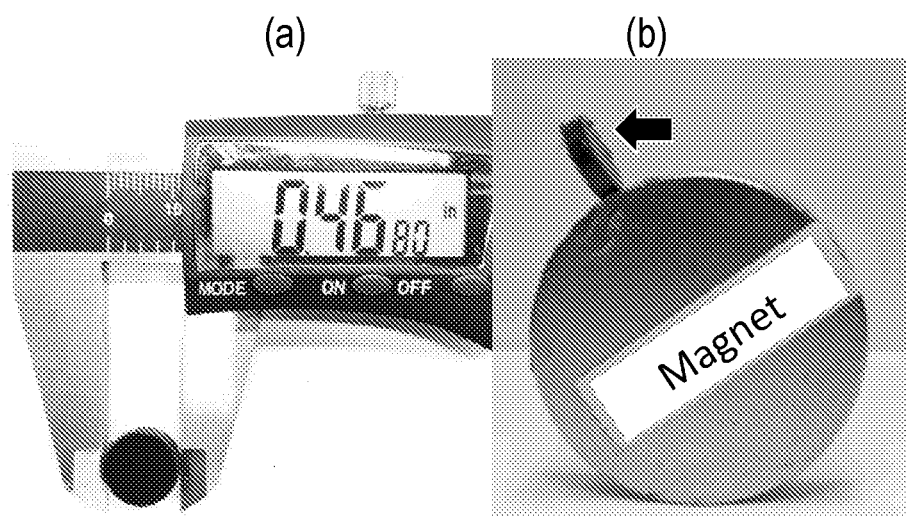

FIG. 25 shows a gradient nanoparticle embedded plastic. (a) A photo of the sample, where the gradient nanoparticle is embedded in PVDF and pressed into a disk test sample. (b) A photo of the resulting highly magnetic composite disk attracted to a magnet.

Figure 26:
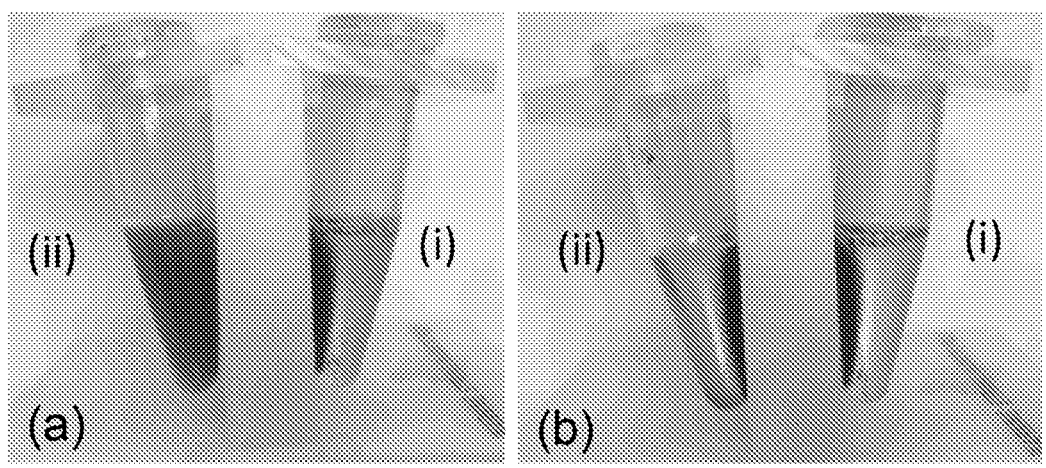

FIG. 26 shows the results of a magnetic bead clearing test in aqueous buffer comparing a functionalized gradient nanoparticle (i) to commercially available MagnaBind™ (a, ii), and TurboBeads™ (b,iii). Photograph taken 10 seconds after loading onto magnetic stand.

Figure 27:
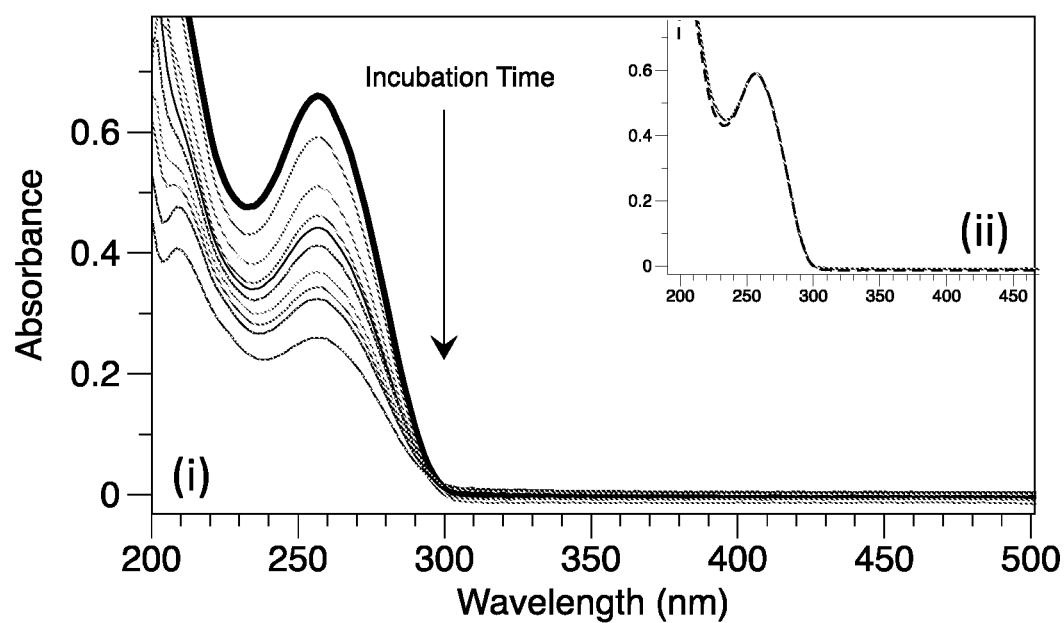

FIG. 27 shows a typical UV-vis spectra monitoring ssDNA (30 bases) concentration over exposure time to gradient nanoparticle magnetic beads (i) where both ssDNA and gradient nanoparticles concentrations were at micromolar concentrations, dispersed in PBS buffers (pH=7.4). A control experiment (ii) using a poor affinity gradient nanoparticle bead showed no observable ssDNA absorption over a similar time period

DETAILED DESCRIPTION OF THE EMBODIMENTS

The present invention involves forming a nanoparticle with a composition that varies radially from the center. In a simple embodiment, consider the formation of a nanoparticle with a metallic iron center (Fe), and increasing concentrations of nickel (Ni), chromium (Cr), alloys of nickel and chromium (Ni$_X$Cr$_Y$), or empty void or hollow regions (denoted as "v"). Such nanoparticles are denoted for simplicity as; Fe—Ni, Fe—Ni—Cr, Fe—Cr—Ni, Fe—Cr$_X$Ni$_Y$, Fe-v-Ni, Fe-v-Cr, Fe-v-Ni-v-Cr, and Fe-v-Ni$_Y$Cr$_X$. A key characteristic of these nanoparticles is that they initiate from, and retain metallic characteristics. For instance, care much be paid to ensure that the Fe center is metallic, and that reduction-oxidation chemistry does not result in electrochemical plating or oxidation of the gradient. While in the present system the materials were prepared under air free conditions, other conditions, chemicals, and treatments should also ensure that these compositions can be prepared.

Figure 1:
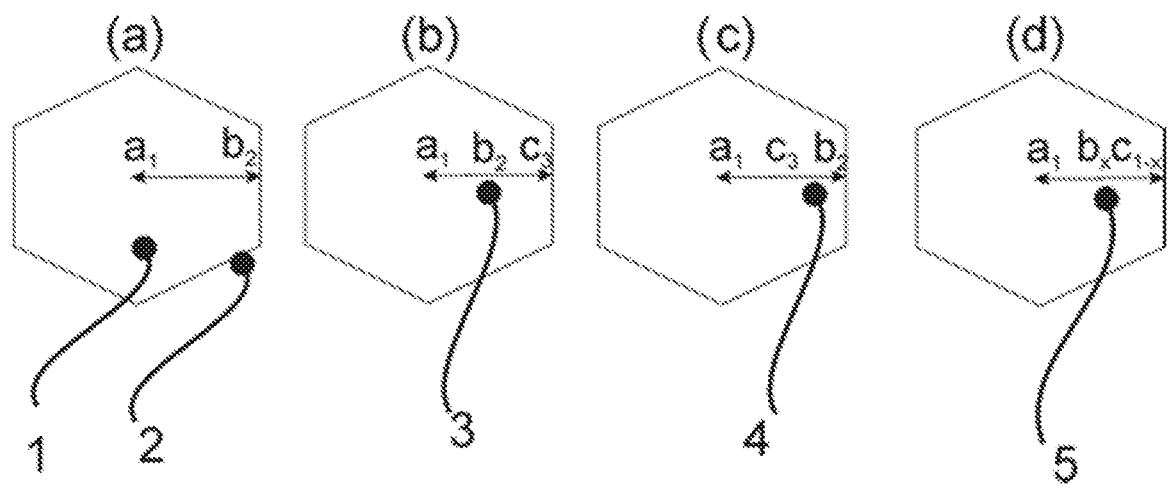

FIG. 1 shows a schematic of the nanoparticle design and composition. The gradient can be greater than 2 metals of choice, and the gradients can be varied in terms of metal position and concentration. A few specific examples were chosen to prove the veracity of the approach, namely, Fe—Cr, Fe—Ni, Fe—Cr—Ni, Fe—Ni—Cr, Fe—Mn, Fe—Co and Fe—$Cr_xNi_{1-x}$ NPs. An important characteristic of the approach of the present invention is that all the nanoparticles and the precursors are fully reduced to a metal state, and no oxides are present during the first creation of the nanoparticle. The metallic α-Fe center was chosen as a starting because of its abundance, and its crystalline structure being body centered cubic (b.c.c.), a starting material significantly improves the alloying, diffusion and oxidation control of the rest of the gradient. In a first example, the gradient consists of a Fe—Ni composition, where the Ni composition and thickness is controlled.

Figure 2:
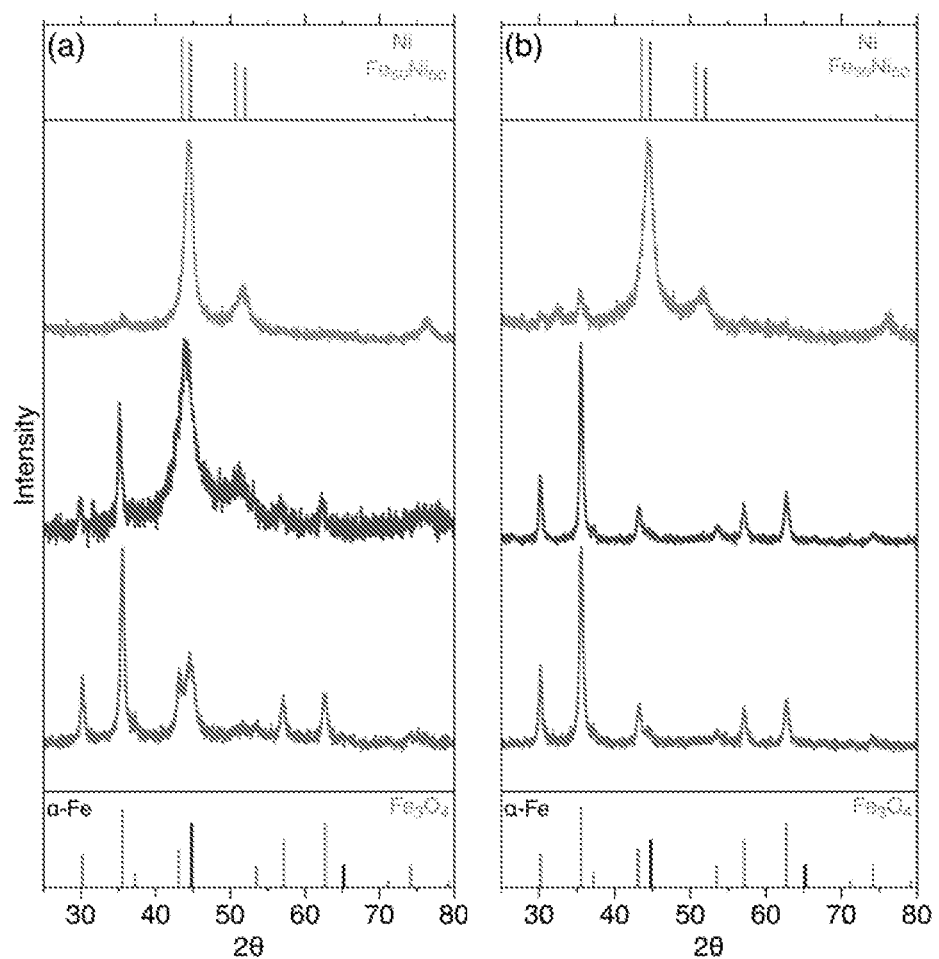
FIG. 2 is an XRD of resulting NPs before (a) and after (b) oxidation for Ni—Fe=low- (bottom), medium-, (middle), and high-nickel gradients (top), which correspond to nickel rich domains of thickness 0.5, 2.0, and 5.0 nanometers. Results show improved oxidation resistance at high nickel gradients.

FIG. 2 shows a powder X-ray diffraction (XRD) characterization for the Fe—Ni nanoparticles produced at nickel gradients of low (i), medium (ii), and high (iii) before (a) and after (b) introduction of $O^{2-}$. Here, low implies a narrow Ni-region, typically 1-3 nanometers, medium is 3-5 nanometers, and high is >5 nm. Interestingly, the XRD are very different, signifying the role that Ni gradient is playing in the system. For example, at low gradients, significant oxidation is observed before and after the sample was introduced to $O^{2-}$. (FIG. 2b-i). The sample could be further oxidized (addition of $O_2$) by heating the Ni—Fe to 100° C. while opening the reaction vessel to air, which results in complete oxidation to a $M_3O_4$ (M=Fe, Ni) crystal type. Increasing at medium Ni-gradients (ii), results in the formation of NPs with a coexistence of metallic b.c.c. and metallic face centered cubic, f.c.c., with less $M_3O_4$ oxide, being present. At high Ni-gradients, the NP become exclusively f.c.c., and, and remain in metallic form even after introduction to $O_2$ at elevated temperatures. Interestingly, the XRD pattern was stable after 4 months of being in atmospheric conditions.

Figure 3:
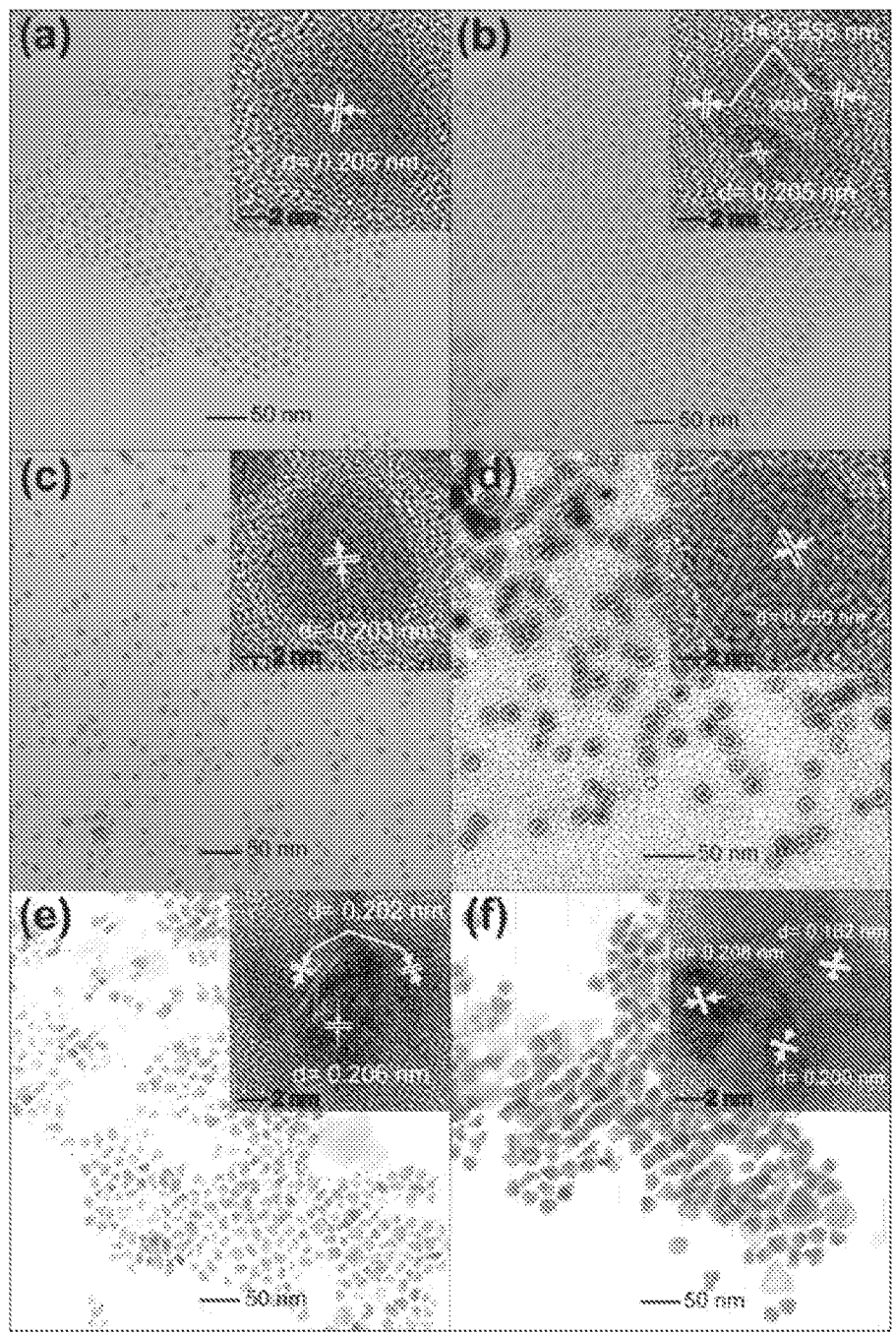
FIG. 3 is TEM images of Fe—Ni gradient nanoparticles with low- (a), medium- (b), and high- (c) gradients before oxidation. After oxidation (d-f), the low-nickel gradients (d) show a void rich (hollow) internal microstructure (v-Fe—Ni composition), and the medium-nickel gradients show a void inbetween the two gradients (Fe-v-Ni gradient).

FIG. 3 shows the TEM and HRTEM of the Fe—Ni gradient nanoparticles NP at low (a), medium (b), and high (c) Ni-gradients both before (left panel) and after (right panel) introduction of $O^{2-}$. In this embodiment, the average nanoparticle diameters (d) were 12.0±1.5 (a), 11.2±1.2 (b), and 18.0±2.6 nm (c) before oxidation, which indicates actual gradients of 0.5, 2.0, and 5.0 nm. For simplicity, the samples are referred to as low (l), medium (m), and high (h) gradients from here forward. Before oxidation the NPs have a solid form, and only the h-gradient Fe—Ni compositions showed a change to an elongated morphology. Interestingly, after introduction of O2-, the l- and m-Fe—Ni NPs showed considerable morphological change, where the internal gradients are now co-existed with void regions (v) within the interior of the NPs. The v-gradient regions are observed by the lack of contrast in the TEMs, which upon investigation by HRTEM, show no lattice planes, indicating empty space, or complete atomic disorder. This was especially true for the low-gradient Fe—Ni (FIG. 3a-ii), where the NP was primarily hollow albeit for one domain on the side of the void.

Figure 4:
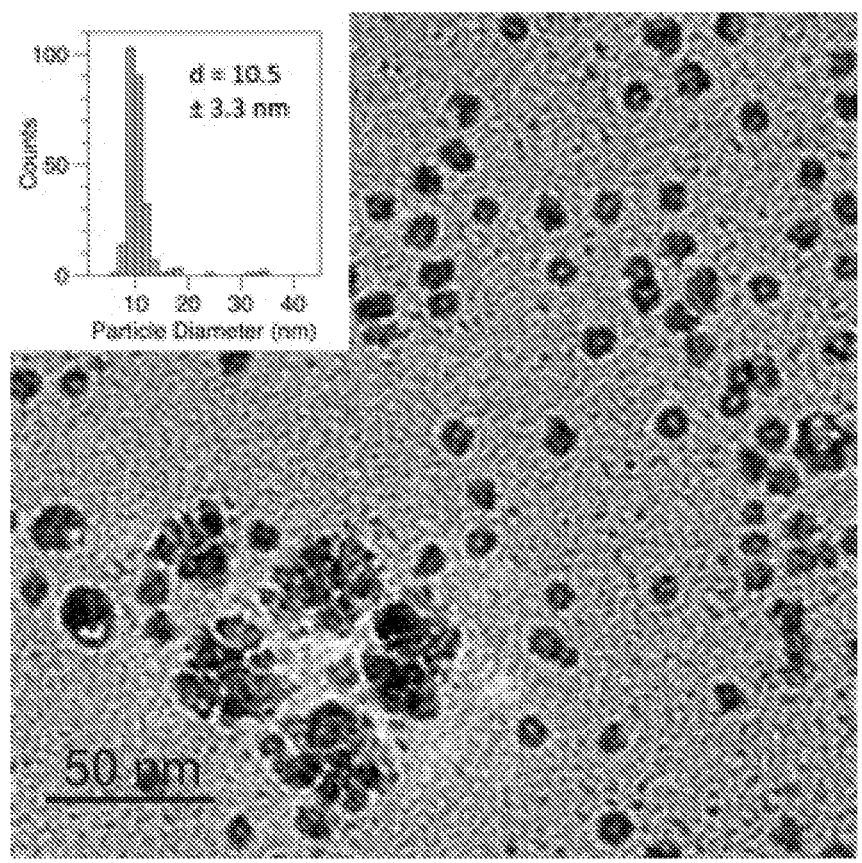
FIG. 4 is higher temperature annealing and oxidation at 140° C. (compared to 100° C.

FIG. 4 shows the HRTEM elemental mapping scan of the oxidized low- (a), medium- (b), and high-gradient Fe—Ni. For low-Fe—Ni (a), the elemental scan shows the nanoparticle gradient, which has a slight Ni shoulder, which is most likely the reason for asymmetric void formation. Interestingly, the Fe-gradient is observed near the outer periphery of the gradient, indicating significant Fe-diffusion. The medium-Fe—Ni is shown to map well to the Fe—Ni gradient, there the boundary at Fe—Ni is gradual (b). The high-Fe—Ni exhibited a similar gradient profile with higher Ni-domain, and little to oxide growth.

The change in composition of the gradient nanoparticles, as well as their metallic nature was further confirmed via X-ray photoelectron spectroscopy (XPS). Table 1 shows the respective compositions, and composition changes upon introduction of $O^{2-}$. For instance, the total Fe-composition was 53.1%, 48.8%, and 31.2% and Ni-composition was 46.9%, 51.2%, and 68.8% for low-, medium-, and high-Fe—Ni gradients respectively, demonstrating the increased Ni-content. Upon introduction of $O^{2-}$ to the gradient, the Fe-composition remained high at 55.3% and 87.4% for low- and medium-gradients, respectively. This suggests the diffusion of Fe atoms outward during oxidation, resulting in the formation of an outer metal oxide layer that is Fe-rich but still contains Ni. Ni composition remains high at 73.3% after oxidation for the thick-Ni—Fe gradient, suggesting that this Ni-gradient composition is required for complete passivation of the Fe-gradient, leading to the improved oxide resistance.

TABLE 1

XPS determined surface composition ratios.

| | As Synthesized | | | Oxidized | | |
|---|---|---|---|---|---|---|
| NP | Fe (%) | Ni(%) | Cr (%) | Fe(%) | Ni(%) | Cr (%) |
| t-Ni/Cr | 53.1 | 46.9 | — | 55.3 | 44.7 | — |
| m-Ni/Cr | 48.8 | 51.2 | — | 87.4 | 12.6 | — |
| th-Ni/Cr | 31.2 | 68.8 | — | 26.7 | 73.3 | — |
| Fe/Cr/Ni | 42.5 | 43.4 | 14.1 | 37.6 | 24.7 | 37.8 |
| Fe/Ni/Cr | 18.5 | 62.1 | 19.4 | 35.8 | 48.1 | 16.1 |
| Fe/$Cr_xNi_{1-x}$ | 37.6 | 43.1 | 19.3 | 32.7 | 48.4 | 18.9 |

Figure 5:
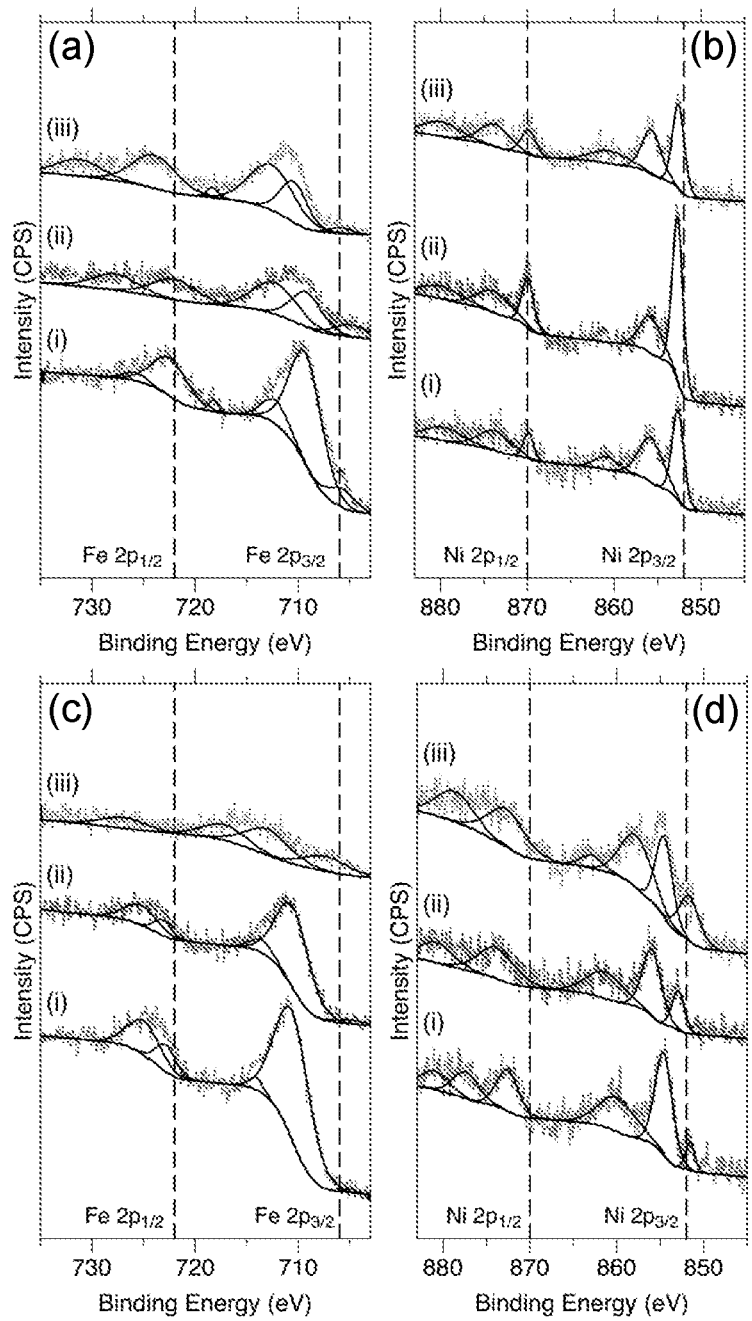
FIG. 5 is an XPS analysis of Fe 2p, and Ni 2p binding energy regions for Ni—Fe=low- (i), medium- (ii), and high- (iii) nickel gradients before (top panel, a-b) and after (bottom panel, c-d) oxidation.

FIG. 5 shows the 2p binding regions for iron and nickel before (a,b) and after (c,d) O2- introduction for the low- (i), medium- (ii), and high-Fe—Ni gradients (iii). Before oxidation (a-b) the Fe 2p shows binding energies (BE) of ~707 eV, which is characteristic of $Fe^0$ (the metallic state), as well as more prominent peaks at 709.7 eV (i), 711.1 eV (ii), and 711.5 eV (iii), which indicate a oxide gradient growth. As the Ni-gradient increases to medium- and high-, the Ni 2p region shows increasing metallic $Ni^0$ character (the metallic form), as is indicated by 2p(3/2) binding energy (B.E.) at 852.7 (i), 852.8 eV (ii), and 852.6 eV (iii), which suggest the nanoparticle has a low oxide gradient.

After oxidation (c-d) both Fe2p and Ni2p show a small increase in percentage of higher BE signals, confirming the oxide growth of the NPs. However, of particular interest is the observation of metallic $Fe^0$ being observed (BE≈707 eV) even after extensive oxidation. This observation is increasingly rare in nanoparticle systems constructed with iron, where iron oxides of $Fe_3O_4$ or $Fe_2O_3$ are observed. Taken together, these results strongly support the importance of the metallic Fe—Ni gradient in the oxide resistance and property performance.

The results above suggest the outward Fe diffusion from the nanoparticle center through the Ni interface during synthesis and oxidation. Given this, additional composition gradients were explored, including tri-metallic system consisting of Fe—Cr—Ni, Fe—Ni—Cr, and Fe—$Cr_xNi_{1-x}$ nanoparticles of similar dimensions and shapes. In these systems, the importance of the Cr layers is to provide a third diffusion barrier or promoter, which is predicted above to lead to more transformations during alloying or oxidation, whereas the gradients of the $Cr_xNi_{1-x}$ alloys introduce new barriers for oxide growth.

Figure 6:
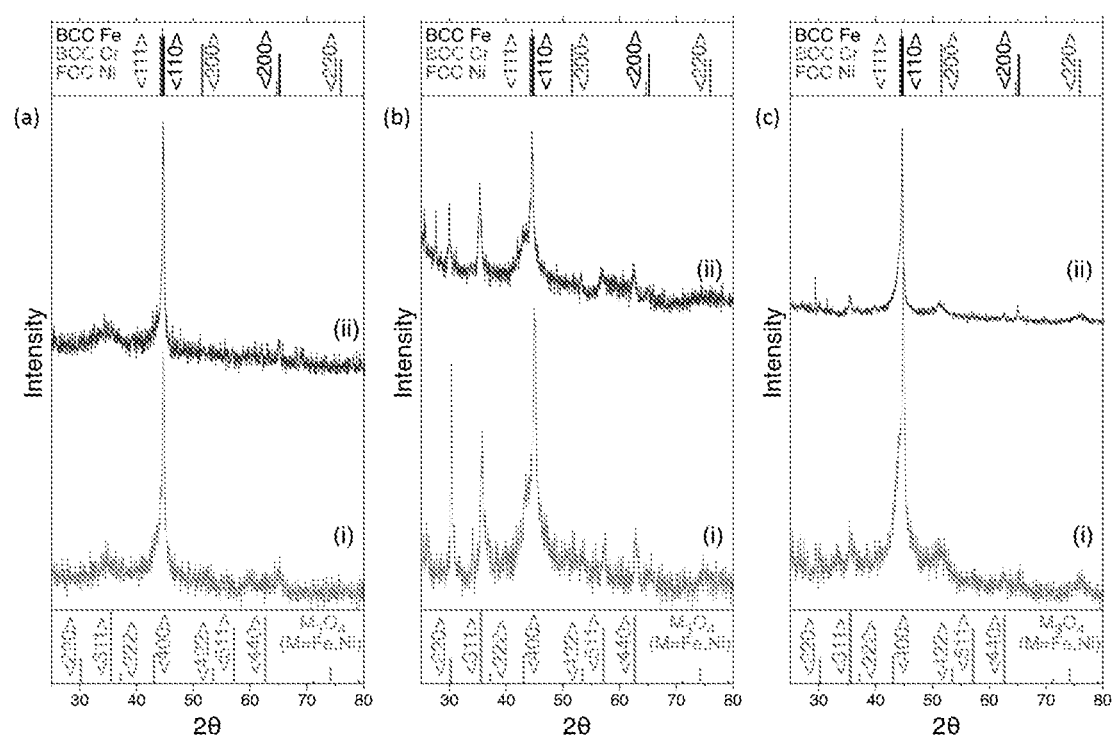
FIG. 6 is a powder XRD of the Fe—Cr—Ni NPs (a), Fe—Ni—Cr NPs (b), and Fe—$Cr_xNi_{1-x}$ gradient nanoparticles (c) before (i) and after (ii) oxidation. Results indicated improved oxidation resistance in both a and c.
Figure 7:
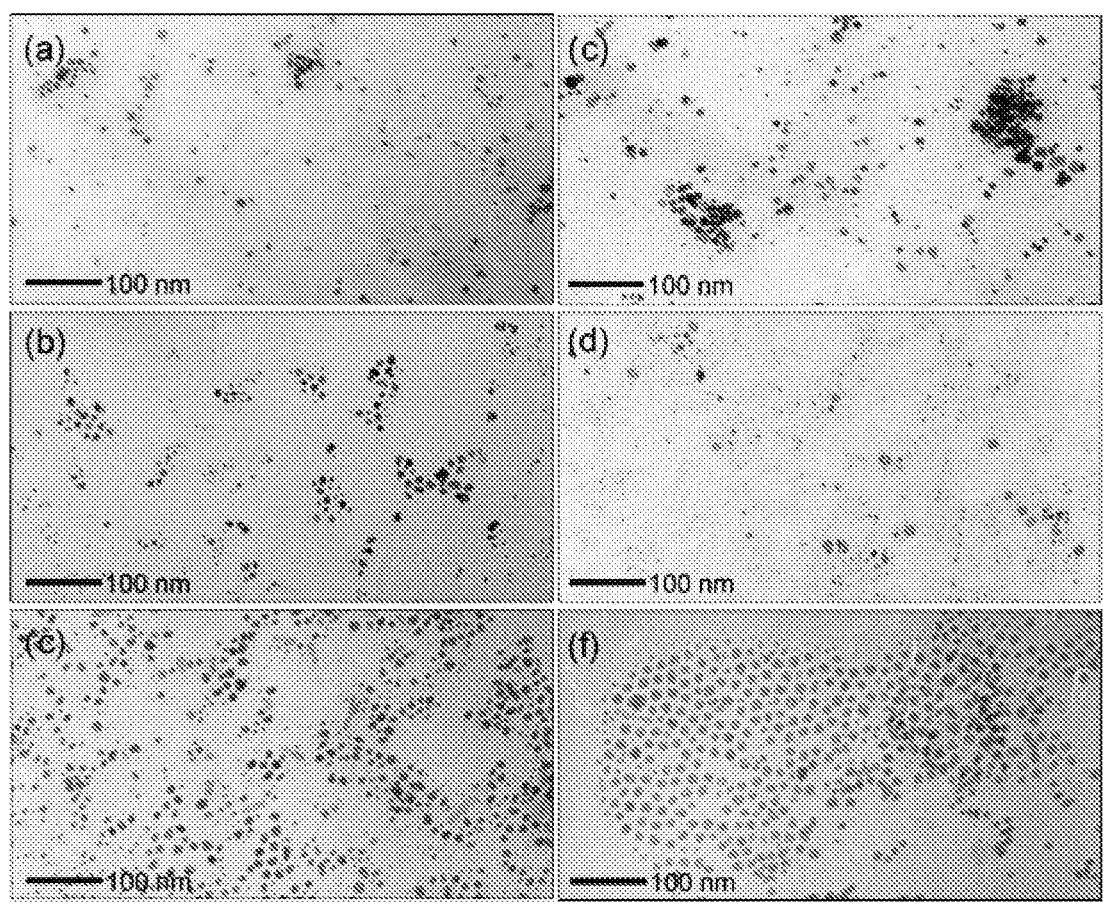
FIG. 7 is TEM micrographs of Fe—Ni—Cr (a), Fe—Cr—Ni (b), and Fe—$Cr_xNi_{1-x}$(c) NPs before and after (d, e, f) oxidation.
Figure 8:
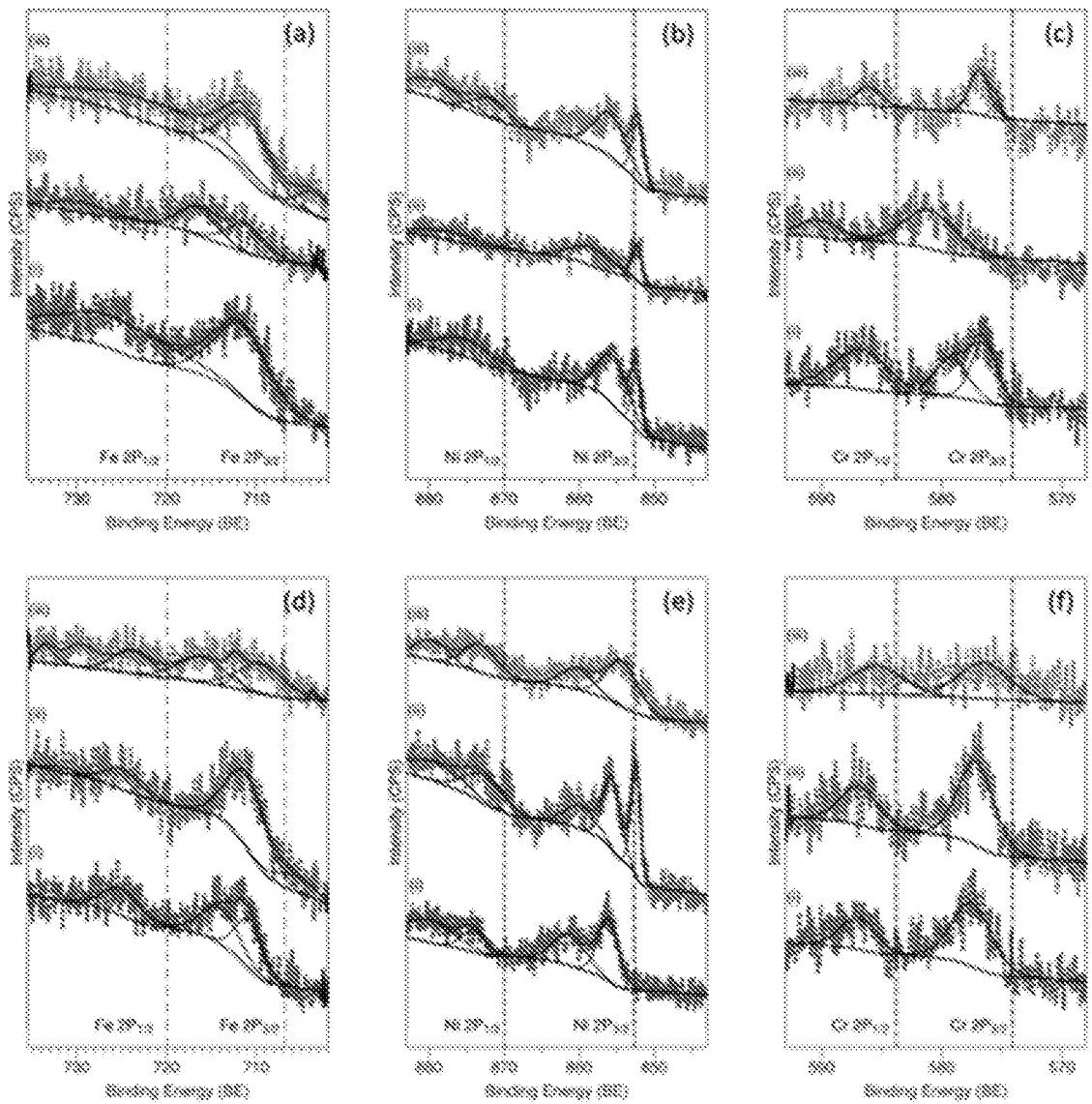
FIG. 8 is an XPS analysis of Fe 2p (a), Ni 2p (b), and Cr 2p (c) binding energy regions for Fe—Cr—Ni (i), Fe—Ni—Cr (ii), and Fe—$Cr_xNi_{1-x}$ (iii) NPs before (top panel, a-c) and after oxidation (bottom panel, d-f).
Figure 9:
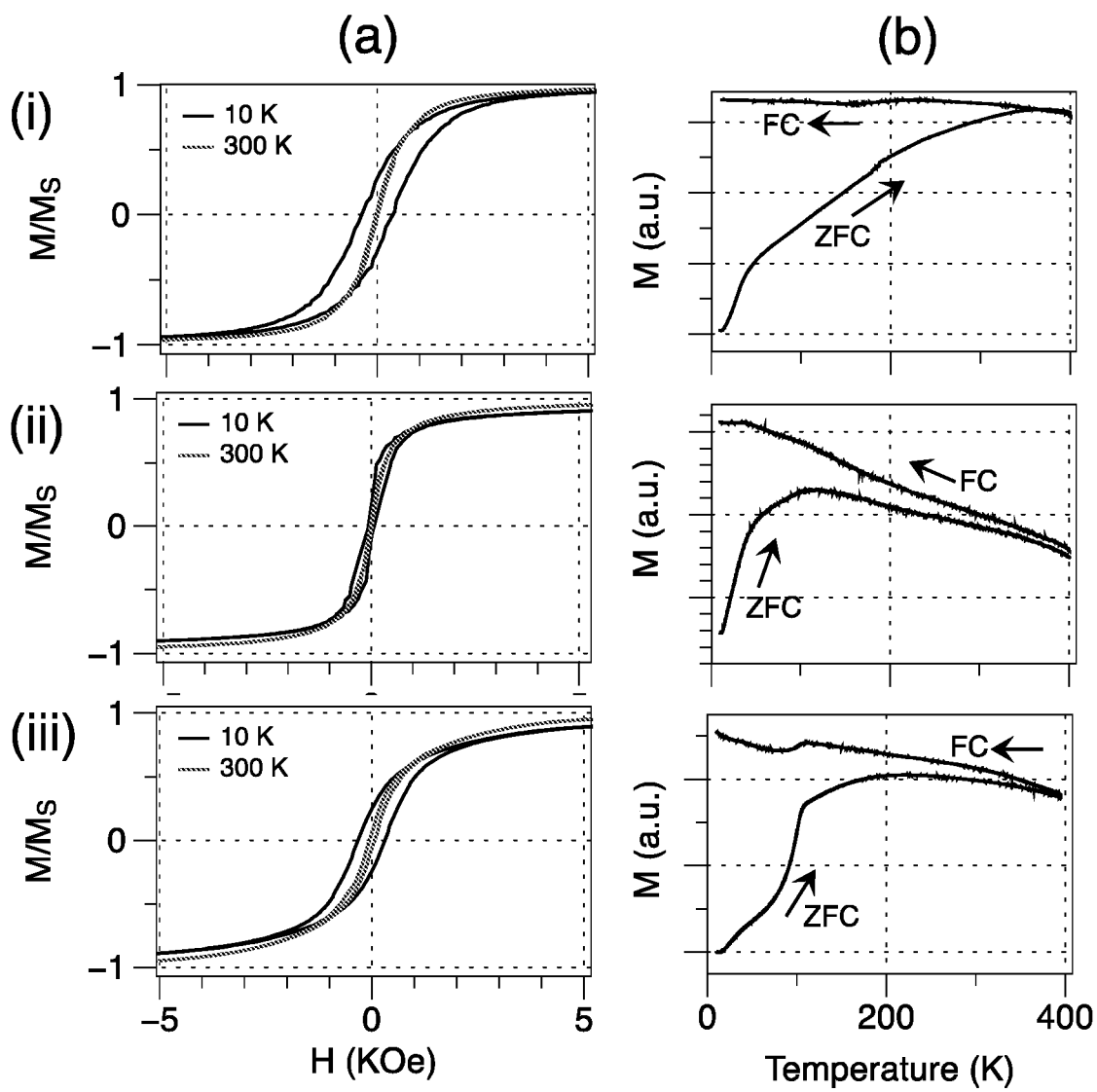
FIG. 9 is a series of magnetic hysteresis plots measured at 10 and 300 K (a), and zero field cooling (ZFC) and field cooling (FC) plots (b) for oxidized Fe-$Fe_xNi_{1-x}$ low (i), medium (ii), and high gradients (iii).

FIG. 6 shows the XRD for Fe—Cr—Ni (a), Fe—Ni—Cr (b), and Fe—$Cr_xNi_{1-x}$ (c) gradients. In this embodiment, a gradient diffusion layer of ~1 nm was chosen. The development of oxide rich gradients in these tri-metallic gradients is found to be highly sensitive to the gradient composition. For example, the XRD for Fe—Cr—Ni (FIG. 6a) shows metallic b.c.c. <110> reflections, and weak f.c.c. <111> reflections both before (i) and after (ii) $O^{2-}$ introduction. Interestingly, $M_3O_4$ oxide reflections are minimal, with only a weak <311> reflection being observed. Here, the importance of the Ni-rich outer gradient minimized further surface oxidation, as the bare Fe—Cr NP more readily oxidizes. Of particular novelty, if the gradient composition is reversed, as in the case of the Fe—Ni—Cr (FIG. 6b), the final gradient composition is always an oxide, as observed by the coexistence of a $M_3O_4$ pattern. The interior of the gradient remains metallic, as is suggested by the retention of the before mentioned b.c.c. reflections. Finally, and of equal novelty, is the Fe—$Cr_xNi_{1-x}$ gradient NPs, in which the Cr—Ni gradients is a more consistent composition change, produces NPs which maintain their metallic state before and after introduction of $O^{2-}$ (FIG. 6c).

The tri-metallic gradient nanoparticles were characterized by TEM. The Fe—Cr—Ni gradients showed diameters of d=7.0±3.0 nm before oxidation, and a similar size after oxidation d'=7.6±3.6 nm. The Fe—Ni—Cr had sizes of d=8.7±2.3 nm before and d'=12.3±3.3 nm after oxidation. The Fe—$Cr_xNi_{1-x}$ had d=11.0±1.8 nm before and d'=10.9±2.0 nm after oxidation.

The tri-metallic compositions and elemental states were characterized by XPS. Fig. X shows the Fe—Cr—Ni gradients (red). Before oxidation, the Fe (a, i) shows metallic character with the presence of $2p_{3/2}$ and $2p_{1/2}$, BE at 712.02 eV and 726.64 eV, respectively. After $O^{2-}$ introduction, the $2p_{3/2}$ BE (d, i) slightly shifts to higher energy to 714.6 eV. The Ni 2p BE before oxidation (b, i) is predominantly metallic at 875.56 eV, with $Ni^{2+}$ forms at 852.94 eV, and 856.04 eV ($2p_{1/2}$). After $O^{2-}$ introduction, the $2p_{3/2}$ peak (e, i) is shifted to 880.65 eV, and $2p_{1/2}$ peaks are shifted to 856.75 eV, 861.91 eV indicating only minimal oxide growth. The Cr 2p signatures have higher BE value and show almost no change prior to (c, i) and after oxidation (f, i) which suggests that the oxidation has occurred. Cr $2p_{3/2}$ peaks are observed at 578 eV and $2p_{1/2}$ peaks are at 587 eV.

In case of Fe—Ni—Cr gradients (blue), the Fe $2p_{3/2}$ peaks before (a, ii) and after (d, ii) $O^{2-}$ introduction are present at 711.56 eV, 716.80 eV and 711.76 eV, and $2p_{1/2}$ Peaks are present at 730.12 eV, and 732.33 eV, respectively. Unoxidized Ni BE (b, ii) are at 852.70 eV, 858.66 eV ($2p_{3/2}$) and 877.74 eV ($2p_{1/2}$). After oxidation, peaks (e, ii) are shifted to higher energy at, 856.34 eV, 860 eV (2p3/2) and 880.23 eV ($2p_{1/2}$). High BE values of Cr peaks indicate chromium oxidation. Cr $2p_{3/2}$ peaks for unoxidized (c, ii) and oxidized (f, ii) samples are present at 581.32 eV and 577.84 eV, and 2p1/2 peaks are present at 590.56 eV, and 587.55 eV, respectively.

For these NPs, XPS results show oxidation which is in well agreement with the PXRD results. Table 1 lists the elemental compositions of these gradient nanoparticles. In each case, the presence of both nickel and chromium is confirmed, with only the Fe—Ni—Cr showing a considerable increase in nickel content. Post oxidation, the concentrations remain similar except in the Fe—Ni—Cr case, which shows a considerable increase inc chromium concent, suggesting a loss of either nickel or iron as a result of the oxidation step.

The Fe—$Cr_xNi_{1-x}$ gradients show Fe 2p BE regions with clear energy changes. Before $O^{2-}$ introduction, the Fe 2p regions (a, iii) are broad and spread out while oxidized Fe 2p peaks (d, iii) are localized and are in multiple positions. Ni $2p_{3/2}$ peaks before oxidation (b, iii) are present at 853.04 eV and 856.73 eV but after oxidation (e, iii) are shifted to 856.24 eV and 862.27 eV. Ni $2p_{1/2}$ peaks before oxidation are present at 872.75 eV and 880.25 eV, but after oxidation are shifted to 875.17 eV and 881.75 eV. Cr peaks as seen in other systems, were present at higher BE values. Importantly, metallic Cr BE characteristics are shown to be present at 576.95 eV, 577.72 eV ($2p_{3/2}$), and 586.95 eV ($2p_{1/2}$), indicating that the Fe—$Cr_xNi_{1-x}$ have metallic Fe, Ni, and Cr.

Taken together, the XPS results of the trimetallic gradients show evidence of the metallic rich nature of the nanoparticles, that oxidation can be tailored by gradient sequence and composition, and that gradients have been discovered with strongly retain the metallic characteristics of the nanoparticle.

Iron oxide nanoparticles have long been studied for their size-tunable magnetic properties, which are known to demonstrate superparamagnetic properties. On the contrary, metallic nanoparticles originating from ferro-magnetic metals may have additional magnetic strength and coercivity (Hc). This area of research is not well known, due to the challenge of preparing nanoparticles with metal states. As shown above, the gradient nanoparticles described herein are strongly metallic, and the magnetic characteristics are described below.

Figure 10:
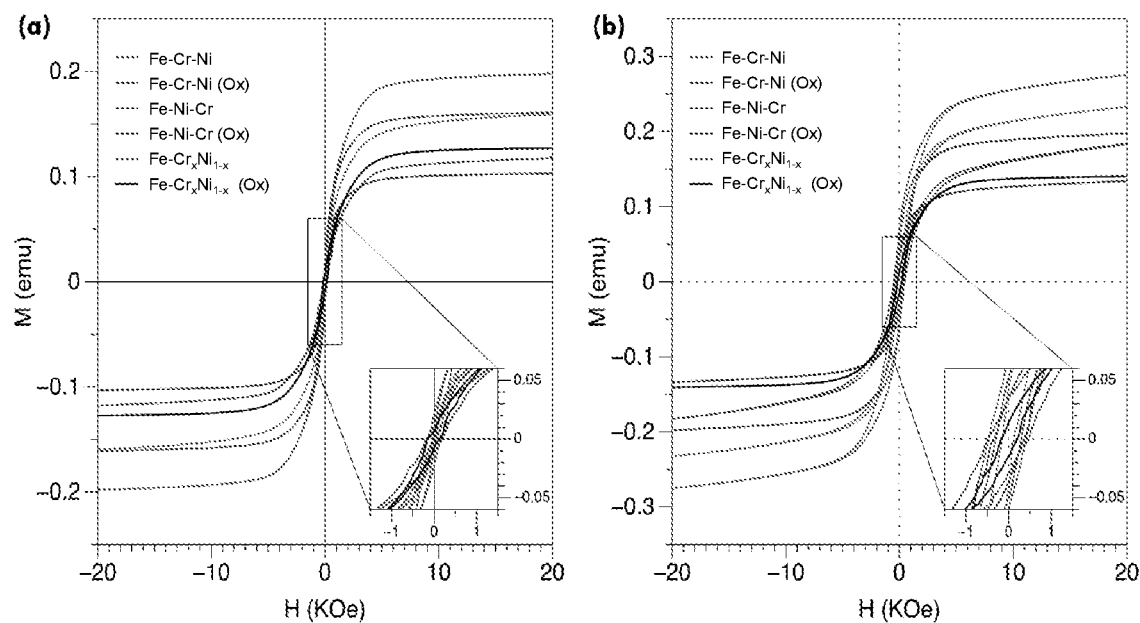
FIG. 10 is magnetization hysteresis loops for Fe—Cr—Ni, Fe—Ni—Cr, Fe—Cr$_x$Ni$_{1-x}$ before and after oxidation ("denoted as Ox") measured at 300 (a) and 10 K (b).
Figure 11:
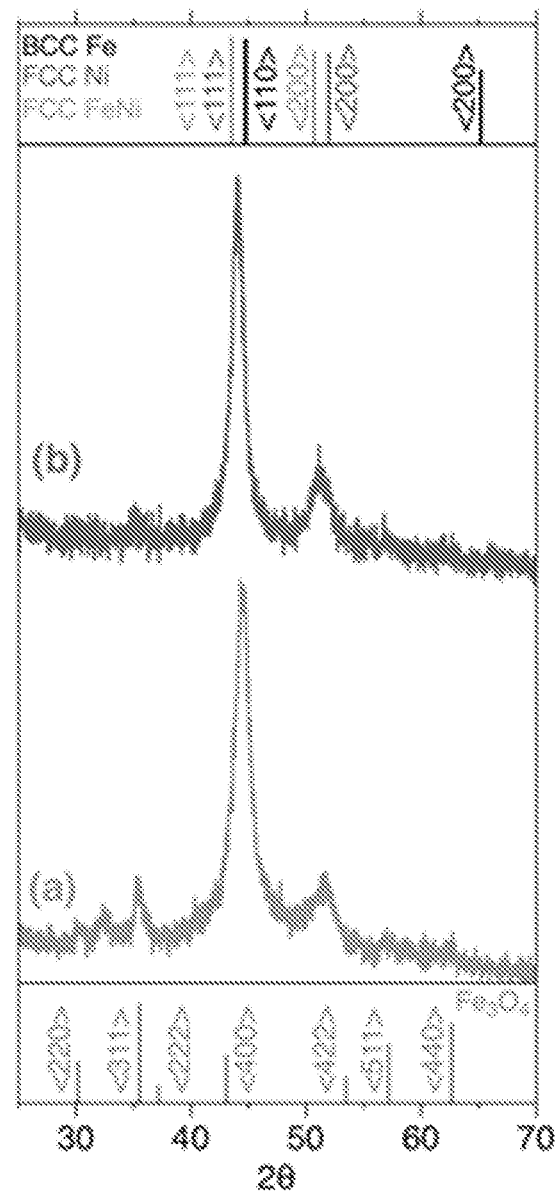
FIG. 11 is a gradient nanoparticle of Ni—Fe gradient of high after oxidation (a) and after oxidation after four months (b). Little to no change in morphology is observed indicating the particles stability and ability to resist oxidation over time.
Figure 12:
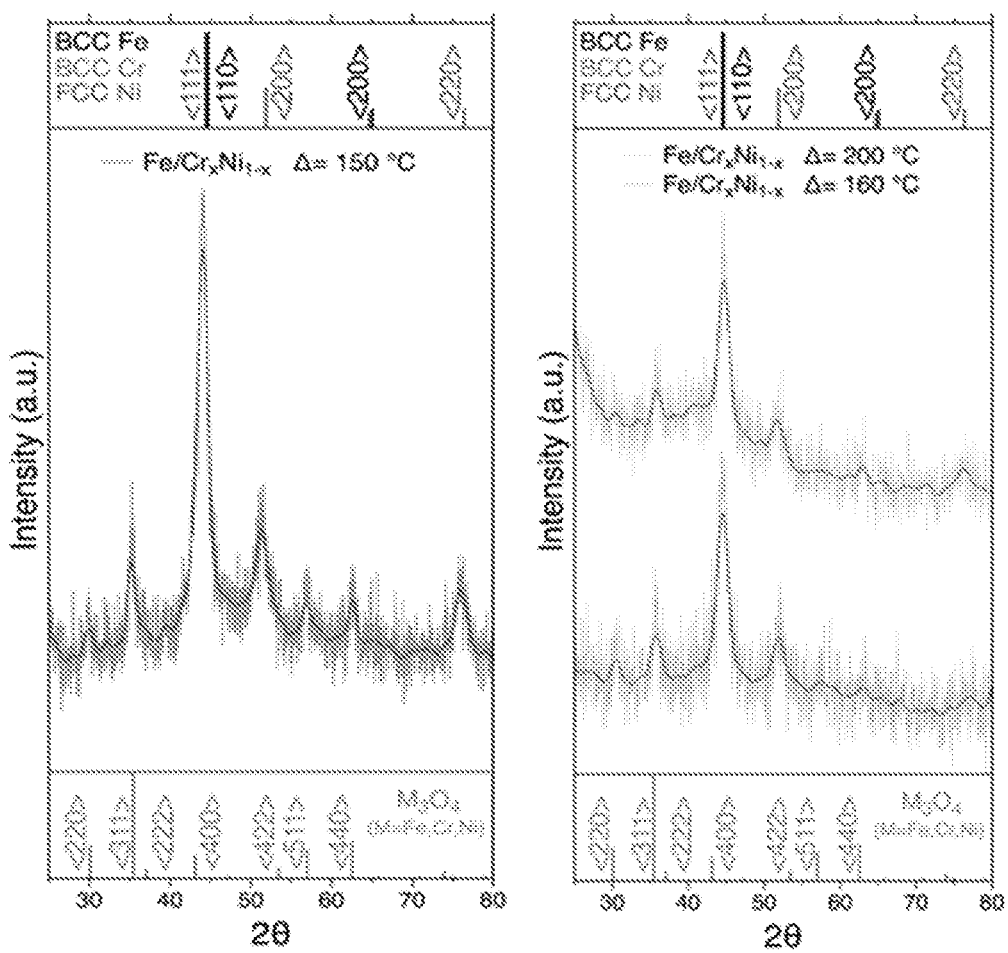
FIG. 12 is the powder XRD for Fe—Cr$_x$Ni$_{1-x}$ nanoparticles prepared at T=180° C. and oxidized in ODE solvent by opening to air at 150° C. (a), 160° C. (b), and 200° C. (b) for 48 h. The persistence of the b.c.c. reflection of Fe/Cr<110> and Ni<111> demonstrates effectiveness of oxidation resistance at the elevated temperatures.
Figure 13:
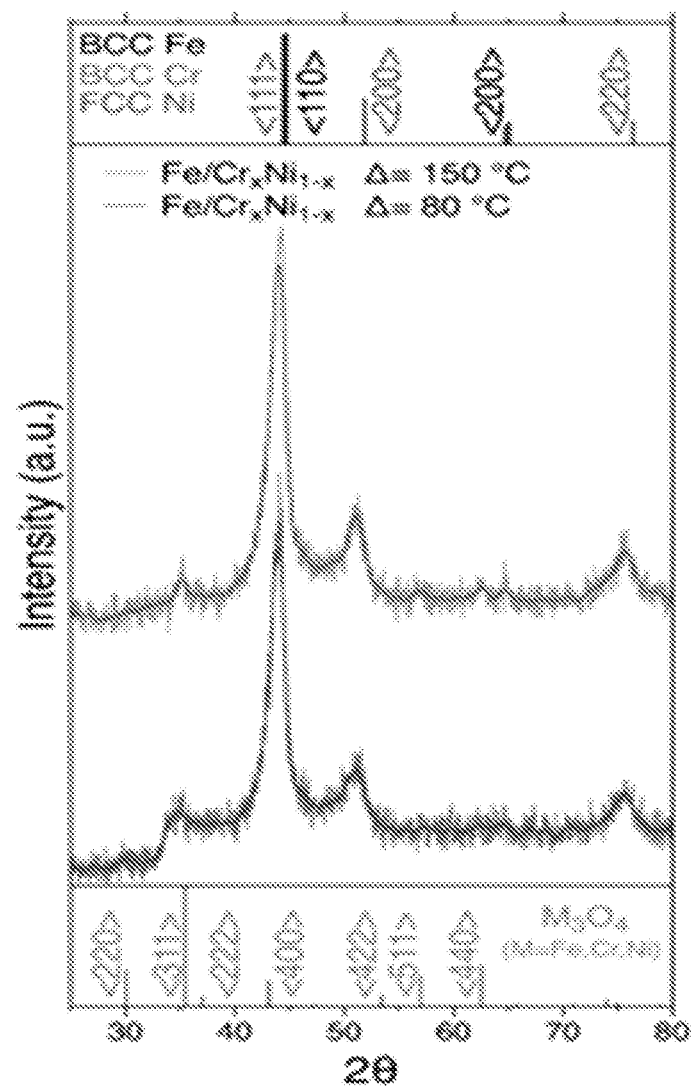
FIG. 13 is the powder XRD for Fe—Cr$_x$Ni$_{1-x}$ nanoparticles prepared at T=220° C. and oxidized while in powder form at 80° C. (a), 150° C. (b) open to air for 48 h. The persistence of the b.c.c. reflection of Fe/Cr<110> and Ni<111> demonstrates effectiveness of oxidation resistance at the elevated temperatures.

Table 2 shows the magnetic properties of the Fe—Ni gradient nanoparticles as prepared and after oxidation. The gradients are superparamagnetic at low and medium-gradients, whereas the high gradients show ferromagnetic properties due to an increase in Hc from zero (superparamagnetic state) to ~100 Oe. Also shown are preliminary magnetization saturation values (Ms) listed in raw emu and normalized emu/g values, where g is the mass of the nanoparticles. The systems have some early variations, however the high emu/g values of >120 show the potential for these materials to be used in many magnetic applications. The magnetization hysteresis loops for these samples are shown in FIG. 10.

TABLE 2

| | 300 K | | | 10 K | | |
|---|---|---|---|---|---|---|
| Fe—Ni | Hc (Oe) | $M_s$ (emu) | $M_s$ (emu/g) | Hc (Oe) | $M_s$ (emu) | $M_s$ (emu/g) |
| As Prepared | | | | | | |
| low | — | | 104.2 | 400 | | 126.0 |
| medium | — | | 29.5 | 65 | | 38.5 |
| high | 100 | | 51.5 | 320 | | 63.5 |
| Post Oxidation | | | | | | |
| low | — | — | 62.7 | 250 | | 68.5 |
| medium | — | | 72.8 | 183 | | 83.1 |
| high | 100 | | 101.5 | 285 | | 131.2 |

Table 3 shows the corresponding magnetic values for the Fe—Cr—Ni, Fe—Ni—Cr, and Fe—CrNi gradient nanoparticles. Compared to the Fe—Ni gradients, these materials show considerable higher Hc indicating improved ferromagnetic characteristics, moreover, the preliminary emu/g values of 140-156 for the Fe—CrNi gradients show tremendous magnetic properties, and also magnetic stability due to the decreased oxidation tendency of the nanoparticles.

The magnetization hysteresis loops for these samples are shown in FIG. 10.

TABLE 3

|  | 300 K | | | 10 K | | |
| --- | --- | --- | --- | --- | --- | --- |
|  | Hc (Oe) | $M_s$ (emu) | $M_s$ (emu/g) | Hc (Oe) | $M_s$ (emu) | $M_s$ (emu/g) |
| As Prepared | | | | | | |
| Fe—Cr—Ni | 351 |  | 29.2 | 405 |  | 40.5 |
| Fe—Ni—Cr | 50.1 |  | 28.4 | 354 |  | 36.85 |
| Fe—$Cr_xNi_{1-x}$ | 199 |  | 22.2 | 112 |  | 32.35 |
| Post Oxidation | | | | | | |
| Fe—Cr—Ni | 353 |  | 25.3 | 466 |  | 39.4 |
| Fe—Ni—Cr | 54.1 |  | 28.5 | 295.2 |  | 35 |
| Fe—$Cr_xNi_{1-x}$ | 283 |  | 141.1 | 201.7 |  | 156 |

The results above indicate that the gradient nanoparticles have highly responsive oxidation properties at the atomic scale and these were further tested for applicability as a passivation layers for bulk substrates. For this, purified gradient nanoparticles were purified as described and dissolved in hexane. These gradient solutions were then used as the ink or paint like material in spray coating, in which compressed gas is used to propel thin coatings of the nanoparticles onto substrates.

FIG. 15 shows a general schematic of the approach. FIG. 16 shows a photograph of an iron nail that was pre sanded to remove any galvanized layers. It is a shiny metal (A). After coating with the gradient nanoparticles, the surface is now a matte-black color (B), of which the thickness is less than 1 micron. FIG. 17 shows a similar coating of an industrial nut-and-bolt, indicating the ease of coating multiple metal surfaces. FIG. 18 shows a similar photo of gradient nanoparticles spray coated onto glass microscope slides, further showing the applicability of coating multiple objects with the nanoparticles.

The gradient coated substrates were then tested at high temperatures and in salt-water, and compared to un coated substrates.

FIGS. 19 and 20 show iron samples heated in an oven at 190° C. for 14 and 40 hours respectively. The bare iron sample (A), oxidizes to dark red (FIG. 19b), or a dark purple blue (FIG. 20b) at these temperatures. In contrast, the gradient nanoparticle on the other hand remains a matte-black finish. In areas of the iron sample that was not completely covered with gradient nanoparticles, oxidation can be observed, which further suggests that the gradient nanoparticle coating is crucial towards stopping oxidation of the iron nail substrate.

FIG. 21 shows a similar sample set in which an iron nail (A) and a gradient nanoparticle coated iron nail (B) were submerged in salt water for 14 h. The iron nail has a dramatic change below the water line (A, about half way up the nail) indicating oxidation. In contrast, the gradient nanoparticle remains largely un changed, and the black gradient coating is not disturbed by the salt rich conditions.

The ability of the gradient nanoparticle to protect rare earth magnets from corrosion was also demonstrated. FIG. 23 shows a set of photographs for a commercial NdFeB magnet before (a) and after (b) coating with gradient nanoparticles. Both samples were immersed in NaCl salt solutions (5% NaCl) for 36 h. The un-coated magnet shows oxidation via color change to the surface and also metal solids in solution and rust color (c), whereas the gradient nanoparticle coated magnet shows no detectable change for the same conditions and exposure time (d).

The high magnetic strengths of the gradient nanoparticle was also used to absorb electromagnetic (EMI) radiation. FIG. 24 shows a typical EMI absorption measurement comparing the absorption rate of the nanoparticles from 8-12 GHz. In these experiments, the gradient nanoparticle was dispersed in a PDMS elastomer. As shown in FIG. 24, a magnetic gradient nanoparticle has >90% absorption in the frequencies studied, which is considerably higher than conventional $Fe_3O_4$ magnetic nanoparticles also dispersed in PDMS elastomer at a similar weight concentration. In FIG. 24(b), the same gradient nanoparticle embedded PDMS elastomer was compared to a commercially available microwave absorber, Eccosorb™. In these tests, the gradient nanoparticle and the Eccosorb™ sample were of similar thickness, however the former was at >10× lower metal loading. Additional tests have shown that the EMI absorption is related to gradient nanoparticle size, composition, and loading. Moreover, further tests indicate that favorable EMI absorption by the gradient nanoparticle extends to frequencies >20 GHz, and that specific frequencies can be targeted.

In addition to PDMS, the gradient nanoparticles were shown to be excellent candidates to magnetically enhance plastics and composites. FIG. 25(a) shows a gradient nanoparticle embedded in PVDF polymer. In these examples, the gradient nanoparticle was dissolved in molten PVDF, and then molded into the cylindrical substrate shown. The resulting composite had magnetic properties proportional to gradient nanoparticle loading, as well as size and composition. FIG. 25(b) shows the gradient nanoparticle PVDF polymer attracted to a magnet, demonstrating the host polymers now magnetic character.

The use of the gradient nanoparticles as magnetic bead supports for life sciences applications was studied. Owing to the tunable nanometer diameters, and the favorable magnetic properties (high magnetic susceptibility, superparamagnetic, etc.), gradient nanoparticles are excellent candidates for life sciences, considering the lack of commercially available nano-sized beads with such properties. FIG. 26 shows a comparison study where gradient nanoparticle beads were prepared as described above, and rendered hydrophilic via a combination of inorganic and organic surface chemistry changes. In FIG. 26, the gradient nanoparticles (i) are compared to commercially available magnetic beads, Thermo Fisher brand MagnaBind™ (a, ii), and TurboBead brand TurboBeads™ TEMPO. The so-called clearing time was compared, as shown when photographed at 10 seconds on a magnetic stand. Considering the properties of gradient nanoparticles in total, which includes strong and tailorable magnetic properties combined with oxidation resistance in a number of conditions, the potential of magnetic beads in controlled capture and release of biologic or environmental targets are nano-sized seems to be more in reach as opposed to using conventional micron sized magnetic beads. Such nano-size targets have comparable sizes, charges, and solubilities to the gradient nanoparticles, making it possible for improved incubations, reactions, and collections, while also providing lower bead backgrounds, and magnetically tuned separation. Examples of nano-sized biological targets include oligonucleotides, single stranded DNA, or double stranded DNA from 10-1000 base pairs, peptides, proteins, viruses, enzymes, exosomes, peptide assemblies, DNA assemblies, and biomacromolecular conjugates, and drugs. As one example, consider a nano-sized biomolecule of short single stranded DNA fragments, the collection of which is challenging using filters, precipitation, and commercially available micron sized colloidal magnetic bead supports. Such separation of short fragments (<300 base pairs), as well as the separation of larger sizes with high fidelity is crucial in applications like PCR cleanup, DNA assays, and a host of emerging diagnostic tests.

As a proof of principle, when the gradient nanoparticles were processed as magnetic beads as described above, they were found to collect short strands of ssDNA. FIG. 27 shows a UV-visible spectra comparing the concentration of a 30-base ssDNA (5'-TTA TGC TAT CGA GTC ATG AAG GTT AGG TTA-3') after exposure to gradient nanoparticle whose surface was modified to collect short fragments of DNA. Over time, the DNA concentration was found to decrease linearly with gradient nanoparticle concentration and exposure time (i). Control experiments (ii) indicate that gradient nanoparticle composition, size, and surface chemistry were key factors in DNA adhesion and release.

Thus, the present invention involves the tuning of the nanoparticles to achieve particular characteristics. As explained herein, the step of tuning the nanoparticles gradient composition and concentration can involve annealing a metallic center of at least one metal in the presence of an interface with at least one second metal, annealing a metallic center of at least one metal in the presence of an interface with at least one second metal whose interface thickness is 0.5-100 nanometers. The particle can range in size from 5-500 nanometers, and exist as any shape or morphology. In the present invention the annealing described is thermal, where the nanoparticle is heated to temperatures of 50-500° C. This annealing of the nanoparticle can be carried out at constant temperatures for extended periods of times, and also employ thermal cycling during the annealing of the nanoparticle, where low, high, and varied temperature ramps are employed. It is envisaged that additional annealing techniques could also be employed, such as microwave irradiation, ultrasonic vibrations, ultraviolet, visible, and near infrared laser light, magnetic fields, as well as radiation. Moreover, the environment the nanoparticle is exposed to during annealing can also be varied to tune the gradient, such as changes to pressures, gas types, oxygen partial pressures, vacuum levels, solvent type, and humidity.

CONCLUSION

Taken together, these results show that nanoparticles with composition gradients can be used to alter nanoparticle oxidation characteristics, morphology/microstructure change, and magnetic performance of materials. The gradients can be varied to allow for purposed gradients for specific applications in fields ranging from corrosion, magnetics, information technology, imaging, electromagnetic absorption, coating technologies, and immunoprecipitation. The simple proof of principle examples shown herein can be easily expanded upon to expand into many areas of industry, technology, and life sciences in the future.

EXAMPLES

Example 1: Synthesis of Fe—Ni, v-Fe—Ni, and Fe-v-Ni Gradients

Crystalline b.c.c. Fe nanoparticles were used. The metallic Fe nanoparticles could be prepared in a number of ways, in this example, it was prepared using the decomposition of iron (0) pentacarbonyl ($Fe(CO)_5$) in the presence of ligands, like oleylamine (OAm), and hexadecylamine chloride (HDACl). In a simple case, 19.0 mL of a high boiling point solvent, like octadecene (ODE), ~200 mg HDACl, and ~1.0 mL OAm were combined and degassed at 120° C. for 0.5 h. This mixture was then heated to 180° C. in a four neck flask under Ar, then 0.35 mL of $Fe(CO)_5$ (1.0 M in THF) was injected via an airtight needle into the solution under Ar forming the iron nanoparticle centers. While in this example the sizes of centers were on the order of 8-12 nanometers and are largely spherical, it is anticipated that the subsequent steps described herein would also work for larger size diameters (5-500 nm), as well as for centers of different shapes (cubes, rods, polyhedral, etc.) after adjustments to concentrations and annealing conditions. For example, after annealing the iron centers for 30 minutes at 180° C., metallic nickel was introduced into the system, where [Ni]:[Fe] molar feed ratios were controlled. In this example, the nickel source was $Ni(PPh_3)_2(CO)_2$ and was chosen due to it's nickel being in a metallic ($Ni^0$) state, however other comparable Ni sources can also be used. In a typical synthesis, 1.5 mmol $Ni(PPh_3)_2(CO)_2$ (3 mL of 0.1 M in THF) was added to the Fe containing solution. The Ni-injection was separated into at least ten separate injections (0.3 mL each) with 15 minute annealing time between injections. The temperature was maintained at least 180° C. The Fe—Ni gradient NPs were purified by precipitation in dry ethanol (EtOH, 200 proof) under Ar. After centrifugation (10 min, 4400 RPM), the product was re-dispersed in dry hexane and stored in Ar. If direct oxidation of the NPs was tested, this was performed by opening the un-cleaned reaction solution to air at 100° C. for 5.0 h, followed by EtOH precipitation. The higher Ni-content gradients could be prepared by increasing the number of Ni-additions, increasing the concentration of Ni per addition, or decreasing the [Fe]:[Ni] molar ratios. See FIGS. 1-5, 9. The Fe—Ni gradient nanoparticles of larger diameters (10-100 nm, >100 nm) could be prepared by altering metal precursor to ligand concentrations, nucleation temperature, or number of gradients.

Example 2: Synthesis of Fe—Cr—Ni Gradients

In the tri-metallic gradient nanoparticle the Cr-precursor was introduced at different points in the synthesis. The hexacarbonyl chromium (0) ($Cr(CO)_6$) precursor solution was prepared by dissolving 650 mg $Cr(CO)_6$ in 20 mL of dioctylether at 100° C. under inert atmosphere. In this example, the $Cr(CO)_6$ precursor was chosen due to its metallic Cr ($Cr^0$), but it is understood that other precursors could be used. The Ni-precursor was prepared similarly to that described above.

In a typical synthesis, 6.8 mL of the Cr precursor was added into solution of Fe NP (prepared as shown above) under Ar at 180° C. For instance, a 2.3 mL aliquot was added slowly then annealed for 15 min before additional components. Next, a total of 9.4 mL of the Ni precursor was slowly added. The temperature was maintained at a minimal of 180° C. Injection amount of Ni precursor was split equally in smaller volumes and added over 50 min to avoid dramatic temperature loss. Solution was annealed for 45 min at 180° C. See FIGS. 6-8, 10. The Fe—Cr—Ni gradient nanoparticles of larger diameters (10-100 nm, >100 nm) could be prepared by altering metal precursor to ligand concentrations, nucleation temperature, or number of gradients.

Example 3: Synthesis of Fe—Ni—Cr Gradients

The Fe—Ni—Cr gradients were prepared similarly, with varied precursor sequence. In this example, a total of 9.4 mL Ni precursor was slowly deposited at temperatures of at least at 180° C. Next, 6.8 mL of the Cr precursor was slowly added at temperatures of at least 180° C. The nanoparticles were purified as described above. See FIGS. 6-8, 10. The Fe—Ni—Cr gradient nanoparticles of larger diameters (10-100 nm, >100 nm) could be prepared by altering metal precursor to ligand concentrations, nucleation temperature, or number of gradients.

Example 4: Synthesis of Fe—$Cr_xNi_{1-x}$ Gradients

The Fe—$Cr_xNi_{1-x}$ gradients were described using the same chemical sources as described above. The $Cr_xNi_{1-x}$ gradients were added from stock solutions containing both Cr- and Ni-precursors. The [Cr]:[Ni] molar ratios of the stock solutions were varied over the course of a typical injection to produce varied x-compositions at a given position in the nanoparticle. In a typical synthesis, 6.8 mL Cr-precursor and 9.4 mL of Ni-precursor solutions were pre-mixed and then slowly injected into a solution containing the Fe-rich solutions, prepared as described above. In this example, the synthesis solution was maintained at temperatures of at least 180° C. See FIGS. 6-8, 10. The Fe—$Cr_xNi_{1-x}$ gradient nanoparticles of larger diameters (10-100 nm, >100 nm) could be prepared by altering metal precursor to ligand concentrations, nucleation temperature, or number of gradients.

Example 5: Synthesis of Fe—$Fe_xMn_{1-x}$ Gradients

Figure 14:
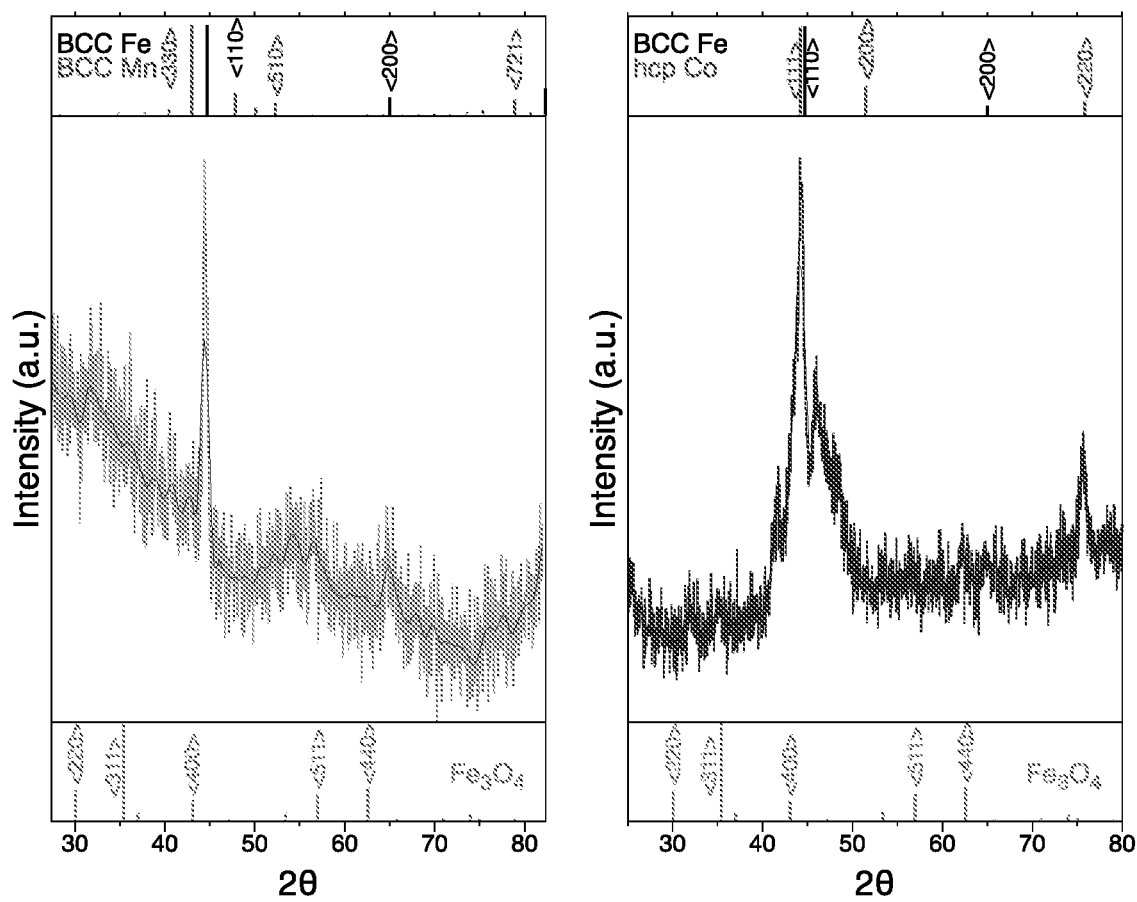
FIG. 14 is the powder XRD for Fe—Fe$_x$Mn$_{1-x}$ (a) and Fe—Fe$_x$Co$_{1-x}$ (b) gradient nanoparticles after oxidation at 100° C. in for 48 h. The persistence of the b.c.c. reflection of Fe—Fe$_x$Mn$_{1-x}$ <110> and Co h.c.p. <111>, <200>, and <220> reflections demonstrates effectiveness of oxidation resistance.

Gradient nanoparticles with Fe—$Fe_xMn_{1-x}$ gradient concentrations were prepared using an analogous approach, where the addition of $Mn(CO)_6$ was introduced shortly after the additional of $Fe(CO)_5$. The [Fe]:[Mn] molar ratios were tailored (100-0) over the course of the synthesis to adjust the gradient. In this system, the use of $Mn(CO)_6$ was employed as a manganese source, however other precursors and metal salts could also be used. See FIG. 14. The Fe—$Cr_xMn_{1-x}$ Gradient nanoparticles of larger diameters (10-100 nm, >100 nm) could be prepared by altering metal precursor to ligand concentrations, nucleation temperature, or number of gradients Example 6: Synthesis of Fe—$Fe_xCo_{1-x}$ Gradients Gradient nanoparticles with Fe—$Fe_xCr_{1-x}$ gradient concentrations were also prepared using of $Co(CO)_6$ was introduced shortly after the additional of $Fe(CO)_5$. The [Fe]:[Co] molar ratios were tailored (100-0) over the course of the synthesis to adjust the gradient. In this system, the use of $Co(CO)_6$ was employed as a manganese source, however other precursors and metal salts could also be used. See FIG. 14. The Fe—$Fe_xCo_{1-x}$ Gradient nanoparticles of larger diameters (10-100 nm, >100 nm) could be prepared by altering metal precursor to ligand concentrations, nucleation temperature, or number of gradients Example 6: Synthesis of Fe—$Fe_xMo_{1-x}$ Gradients Gradient nanoparticles with Fe—$Mo_xCr_{1-x}$ gradient concentrations were also prepared using of $Mo(CO)_6$ was introduced shortly after the additional of $Fe(CO)_5$. The [Fe]:[Co] molar ratios were tailored (100-0) over the course of the synthesis to adjust the gradient. In this system, the use of $Mo(CO)_6$ was employed as a molybdenum source, however other precursors and metal salts could also be used. See FIG. 15. The Fe—$Fe_xMo_{1-x}$ Gradient nanoparticles of larger diameters (10-100 nm, >100 nm) could be prepared by altering metal precursor to ligand concentrations, nucleation temperature, or number of gradients Example 7: Synthesis of Fe—Cr—Fe—Ni—Co—Mn—W Gradients and Variations Thereof Gradient nanoparticles with a general composition of Fe—Cr—Fe—Ni—Co—Mn or Fe—$Cr_aFe_bNi_cCo_dMn_e$, where a-e are compositions that may vary radially from the center of the nanoparticle can be prepared this way, and the alternation of the composition gradient position within the nanoparticle can be similarly controlled by combining the synthesis of two or more of examples 1-6. Annealing temperatures ranging from 180 to 500° C. can be utilized, and elemental introduction and gradient control can utilize multiple injection needles, or more precisely, the multiple syringe pumps that can be automated to control timing and concentration/volume of precursors. Moreover, the addition of additional metals, such as tungsten, and molybdenum can be introduced using precursors such as $W(CO)_6$ and $Mo(CO)_6$, or other suitable metallic precursors. See FIG. 1-14. The Fe—Cr—Fe—Ni—Co—Mn—W Gradient nanoparticles of larger diameters (10-100 nm, >100 nm) could be prepared by altering metal precursor to ligand concentrations, nucleation temperature, or number of gradients Example 8: Synthesis of Gradient Nanoparticles Terminated with Oxides, Sulfides, or Phosphides Gradient nanoparticles prepared in example 1-7 could be terminated with a range of ceramics, oxides, sulfides, and phosphides. For oxides, the nanoparticles could be heated from 80-200° C. in oxygen rich solvent (provided via bubbling of $O_2$ through the solvent) or by various chemical oxidizers. For sulfides, molecules rich with reactive sulfur species are added, such as molecular sulfur ($S_8$) dissolved in octadecene, and sulfurs bound to reactive phosphine's, such as tributylphopshine (TBP), trioctylphospine (TOP), or triphenylphosphine (P(Ph)$_3$). For phosphide gradient growth, reactive phosphine's such as TBP and TOP are added in excess at tempertures of >200° C. The oxide, phosphine, or sulfide concentration can be altered throughout the gradient by varying introduction of chemicals and temperature ramping.

Example 9: Synthesis of Gradient Nanoparticles Terminated with Noble Metals and Alloys The gradient nanoparticles described in examples 1-8 can be terminated with various noble metals or alloys thereof by reducing the metal salts in the presence of a reducing acid. Precursors include, but are not limited to [$AuCl_4$]$^-$, [$PtCl_4$]$^{2-}$, [$PtCl_6$]$^{2-}$, [$PdCl_4$]$^{2-}$, and $Ag^+$. In these situations, the noble metal salt can be complexed with ligands or other surfactants or phase transfer agents to promote solubility in the gradient nanoparticle host solution. Reducing agents employed include: H2 gas purge, sodium borohydride, lithium aluminum hydride, and reduction via the excess amines in gradient nanoparticle solution. By varying the deposition temperature, pressure, and concentrations, noble metal gradient thickness could be controlled from sub-monolayer coverage to multi-nanometer.

Example 10: Synthesis of Gradient Nanoparticles Terminated with Aluminum, Titanium, Vanadium, or Ti—Al—V Alloys The gradient nanoparticles described in examples 1-9 could be terminated or functionalized with gradients rich in aluminum, titanium, vanadium, or alloys thereof. To a solution of gradient nanoparticles during synthesis, reactive aluminum precursors, like alane are added. For titanium, precursors such as $TiCl_4$ in the presence of reducing agents like superhydride are used, or organometallic complexes such as Bis(cyclopentadienly)dicarbonyl titanium (II) or Bis(cyclopentadienly)titanium dichloride μ-Chloro-μ-methylenebis(cyclopentadienyl)titaniumdimethylaluminum can be used. To facilitate alloying, these gradients precursors can be added at controlled times during synthesis and in combination, as well as being heated to elevated temperatures. The addition of vanadium is facilitated by $V(CO)_6$ and $VCl_4$ precursors.

Example 11: Synthesis of Gradient Nanoparticles Terminated with or Containing Rare Earth Elements, Lanthanides, and Actinides The gradient nanoparticles described in examples 1-10 could be terminated with or contain gradients of rare earth elements, rare earth ceramics, lanthanides or actinides. To a solution of gradient nanoparticles rare added earth elements precursors such as neodymium (III) acetate or Tris(tetramethylcyclopentadienyl)neodymium can be added to form interfaces of varied thickness and concentration. Similarly, other rare earths such as cerium (via cerium (III) acetylacetonate or other similar precursor), samarium (via samarium (III) acetylacetonate or other similar precursor), europium (via europium (III) acetate or other similar precursor), galodynium (via gadolinium (III) acetylacetonate or other similar), and yttrium (via Yttrium(III) acetylacetonate or other similar precursor) can be used. In these combinations, allowing with a gradient like those described above would be facilitated by addition of a reducing environment and high temperature annealing. Similarly, rare earth magnetic gradient nanoparticles could be facilitated by addition of Fe (see examples above) and Boron rich precursors (via borane or similar precursors), forming NdFeB-gradient nanoparticles. Such nanoparticles could be terminated with corrosion resistant gradients like those described in examples 1-10 forming highly stable NdFeB nanomagnets. Similarly, gradient nanoparticles terminated with cerium-rich gradients and oxides may also prove effective at corrosion resistance at the nanoscale and bulk form.

Example 12: Spray Coating Gradient Nanoparticle Films

The gradient nanoparticles prepared in examples 1-11 and combinations thereof can be deposited as thin films and coatings in a number of ways. In the simplest form, the gradient nanoparticles are purified as described above and redispersed in a highly volatile solvent at concentrations of at least 10 mg/ml (metal weight). These can then be combined with a paint gun, air brush, or similar device in which compressed air is used to produce a thin stream of the gradient nanoparticles. Controlling spray time, particle concentration, temperature, pressure, and surface treatment, gradients can be deposited on metals, ceramics, glasses, plastics, rubbers, or other objects with varied sizes and shapes. The films can them be further processed in a number of ways, by exposing them to: different temperatures and pressures, excitation or irradiation, or chemical treatment.

Example 13: Electrophoretic Deposition of Gradient Nanoparticle Films

The gradient nanoparticles can be deposited using electrophoretic deposition approaches as well, or other deposition forms closely associated with electrophoretic deposition. For this, highly uniform nature and colloidal stability of the nanoparticle, as well as the charged nature of the metallic gradient interface in association with its ligand surrounding, can be use for deposition. Here, highly charged chemical additives can be added as needed to interact with the nanoparticles interface or surface to increased charge. The concentration of the gradient solutions, field strengths, and time can be used for deposition control.

Example 14: Magnetic Deposition

The strong magnetic properties can also be used to prepare thin films, coatings, and other layering of gradient nanoparticles, where a magnetic field is placed in close proximity to a substrate of choice that has been submerged in a solution of gradient nanoparticles. By controlling the magnetic field and strength, gradient nanoparticle deposition, patterning, and thickness can be controlled.

Example 15: Gradient Nanoparticles in Aerogels and Metal Foams

The gradient nanoparticles can be used as metal sources for aerogels and metal foams. In this process, the gradient nanoparticles are dissolved in supercritical carbon dioxide or a similar supercritical material and placed in a pattern, grid, or other high surface area host material; or combined with polymers and other binders. Upon evaporation of the supercritical fluid complex matrices of interlocked gradient nanoparticles with exist. When combined with gradient nanoparticles rich in voids (v), surface area and weight reduction can be maximized. The dried gradient aerogels can then be processed at different temperatures and conditions depending on final application.

Example 16: Testing of Gradient Nanoparticle Films

The gradient nanoparticles were tested for initial corrosion resistance by spray coating following example 11 onto sanded iron nails, acid cleaned glass, and galvanized nut and bolt examples. The iron nail samples were prepared using gradient nanoparticles from examples 1-10 with coatings that were thick enough to cover the sanded iron surface of the nail. The final appearance of the gradient coated nails is a black-matte finish. These samples were exposed to heating at high temperatures (190° C. or higher) in air for at least 40 h, or submerged into salt water solutions ($[NaCl]>1.0$ M). The samples were then observed for oxidation, mass change, or appearance change. Similarly, NdFeB magnets were coated after gentle removal or protective metal covering. These too were submerged into salt-water solutions ($[NaCl]$ ~5%) and photographed for surface or solution change over time.

Example 17: Testing of Electromagnetic Absorption Properties

The gradient nanoparticles were tested for electromagnetic radiation (EMI) absorption by first drying the nanoparticles under vacuum for 4 h. Next, a desired volume of stylgard polydimethylsioxane (PDMS) was measured and the dried nanoparticles were added. This was followed by vigorous mixing via an overhead mechanical stirrer, upon which the nanoparticles become evenly dispersed. Next the mixture was added to a desired mold, the curing agent was added, and the sample was let to anneal at 80° C. for 6 h. The weight percentage of gradient nanoparticle in the PDMS was varied by simple weight changes to either the amount of PDMS or nanoparticle. A similar approach was used to prepare an iron oxide control, where Fe3O4 nanoparticles of comparable size to the gradient nanoparticle ones were prepared, and dispersed in PDMS at itenticle weight loading ratios. Finally, the samples were analyzed from 8-12 GHz using a frequency analyzer and a suitable electromagnetic source.

Example 18: Preparation of Magnetic Composites

The gradient nanoparticles were also prepared embedded in plastics. Similarly to that above, the gradient nanoparticles were dried thoroughly, and added to either a molten mixture of plastic, or a solution of plastic precursors or monomers, and desired weight percentages. The resulting mixtures were either molded or extruded via a home built set-up. The magnetic properties were studied via both qualitative experiments using different loading ratios, or quantitatively via instrumentation.

Example 18: Magnetic Beads

To utilize the gradient nanoparticles as magnetic beads, the surface alloy composition as well as the surface inorganic- or organic-chemistry encapsulation was varied to render the particles hydrophilic. Using the examples described above, the surfaces further could have a range of different chemistries. The gradient nanoparticle beads were dispersed in water or buffers, and characterized for colloidal stability via UV-vis and Dynamic Light Scattering, whereas composition stability was followed by X-ray diffraction run after exposure to buffer conditions (i.e., salt, water, etc.). The gradient nanoparticle beads were tested for bead clearing efficiency, bead clearing time, and loading efficiency, and compared to commercially available magnetic beads.

Example 19: DNA Clean Up and Immunoprecipitation

The gradient nanoparticle magnetic beads prepared in example 18 were designed and constructed to bind to short strands of single-stranded oligonucleotides (ssDNA) or double-stranded DNA (dsDNA). In typical experiments, the inorganic- or organic-surface of the gradient nanoparticles were tailored to selectively absorb short (<100 bp), intermediate (100~300, 300~800 bp), or long (>800 bp) lengths of DNA. To further facilitate this, the gradient nanoparticle size was also varied from 10-100 nm. The absorption of ssDNA and dsDNA was followed by UV-vis, where a desired concentration was prepared, and monitored after exposure and bead clearing by gradient nanoparticles. The absorption was carried out at various ionic strengths, various DNA to nanoparticle concentration ratios, and either in the presence or absence of additives (i.e., PEG, surfactants, BSA, etc.). Efficient binding and release was found to vary depending on magnetic properties, as well as gradient nanoparticle compositions, as well as nanoparticle size, surface charge, surface chemistry, hydrodynamic radius, and surface double-layer.

Instrumentation

All optical absorption data was acquired using a Varian Cary Bio100 UV-Visible Spectrophotometer (UV-vis). The transmission electron micrographs (TEM) were obtained using a JEOL 2000EX transmission electron microscope operated at 100 kV. Samples were drop cast onto a carbon coated copper grids. The high-resolution TEM (HRTEM) images were collected on a JEOL JEM2100F Field emission TEM operated at 200 kV at the Analytical and Diagnostics Laboratory (ADL) at State University of New York at Binghamton. The instrument was equipped with a STEM detector and an Energy dispersive x-ray spectroscopy (EDS) detector. The Fourier Transform Infrared (FTIR) data was acquired using a Nicolet 6700 FTIR Spectrometer equipped with a diamond smart iTR attenuated internal reflectance accessory, and a liquid N2 cooled MCT-A detector. Samples were drop cast as neat solutions, or dried powders on the ATR crystals. The powder X-ray diffraction (XRD) patterns were taken on a Bruker D8 Advance powder diffractometer using Cu $K_\alpha$ radiation (1.5406 Å). Samples were drop cast and dried on a zero diffraction $SiO_2$ crystal (MTI Corp.). X-ray Photoelectron Spectroscopy (XPS) measurements were performed on Surface Science Instruments (SSI) model SSX0100 that utilized monochromatic aluminum K-α X-rays (1486.6 eV) (Cornell Center for Materials Research, CCMR). The NP powders were dispersed on freshly cleaved Si substrates before analysis. The XPS analysis of peak binding energy and deconvolution was performed using CasaXPS software, in which a Shirley background subtraction was used, as was a 50:50 Guassian:Lorentzian line widths. All XPS were corrected for charging using the C is peak position of 284.8 eV. The magnetic measurements were also conducted at the CCMR on a Quantum Design Physical Property Measurement System (PPMS) with a Vibrating Magnetic Sample (VSM) attachment at an applied magnetic field ranging from −20 kOe to 20 kOe at 300 K and 10 K. Powder magnetic samples were prepared via ethanol precipitation and air-drying, followed by mass readings before measurements.

We expect those skilled in the art to take advantage of the composition of the gradient nanoparticles, the idea of gradient nanoparticles, the oxidation resistance properties of the gradient nanoparticles, and the electronic properties of gradient nanoparticles herein described for various applications as described herein.

Corrosion resistant coatings. Someone skilled in the art can spray coat, spin coat, evaporate, deposit, electrophoretically coat, magnetically coat, or chemically graft the gradient nanoparticles onto surfaces consisting of; metals, plastics, carbon fiber, composites, glasses, ceramics, magnets, semiconductors or any other surface or interface where corrosion in any form is detrimental to performance. It is envisaged that someone skilled in the art would further process these coatings by way of high temperature annealing in a range of temperatures, atmospheres, and pressures to ensure effective coating. Furthermore, it is envisaged that alternating layers of gradients particles of different compositions can be used, and that the gradient nanoparticles can be combined with polymers, plastics, epoxies, silanes and or rare earth additives to promote adhesion and further protect against corrosion.

Information Technology. Someone skilled in the art of crafting magnetic bites of information can take advantage of the uniform size, stability, high magnetic strength, and low coercivity of the gradient nanoparticles for individual bites of information, or in toe construction of magnetic domains which can serve as individual bites of information. It is envisages that thin films, coatings, or patterns of the gradient nanoparticles will be created using the technologies like those described herein. It is further envisaged that the said gradient will be modified and altered in order to tailor magnetic performance, which may or may not include;

increased oxide concentrations, incorporation of rare earth lanthanide ions or atoms, such as; neodymium, yttrium, and samarium, or preparation of novel magnetic solids analogous to heuslar alloys or alnico alloys.

Electromagnetics. Someone skilled in the arts of electromagnetics may take advantage of the unique size, composition, and magnetic properties of the gradient nanoparticles for absorption, reflection, or generation of electromagnetic signals crucial for telecommunications, signal generation and interception technologies, guidance systems. It is envisaged that those skilled in the art will take advantage of the novel stability, magnetism, and composition of the gradient nanoparticles by way of its interaction with the electromagnetic spectrum, and in particular, its absorption, reflection, generation, or detection of microwave irradiation. One such spectrum frequency is called the C-band which ranges from the 4-8 GHz, the X-band which ranges from 8-12 GHz, and K-band, which ranges from the 18-27 GHz, and the K-a-band, which ranges from the 26-40 GHz, and the K-u-band, which ranges from 12-18 GHz and the V- and W-bands, which range from 40-75 GHz, and 75-110 GHz respectively. It is envisaged that devices with said gradients can be deposited onto common ceramic substrates and incorporated into existing technologies. Such deposition methods can include those described herein. It is further envisaged that the gradient nanoparticles will be combined with existing materials of interest to this embodiment, and further, may include combining the said nanoparticles with inert binders, such as carbon and its polymorphs and nano-forms, ceramics and oxides, rubber, or composites thereof. It is envisaged that those skilled in the art will further take advantage of the ability to have varied void concentrations and or additional intermediate layers of metals and oxides.

Magnetic Imaging: Someone skilled in the art of magnetic imaging may take advantage of the size-, functionality-, magnetism-, stability-, and oxidation resistant-properties of the gradient nanoparticles for magnetic resonance imaging (MRI). In this embodiment, the gradient nanoparticle itself is used as the contrast agent allowing for imaging to occur. Those skilled in the art will take advantage of the improved magnetic and corrosion resistance properties of the gradient nanoparticles as compared to the current convention of iron-oxide nanoparticles, of which, the gradient nanoparticles has higher magnetic strength and stability. Furthermore, it is envisaged that the gradient can be designed to improve magnetic response while promoting biocompatibility by terminating the gradient with a medical alloy like composition, as envisaged herein. Due to the stable nature of the gradient nanoparticle, the magnetic properties (susceptibility, strength) will not change over the course of the treatment, allowing clinicians to use lower concentrations of the nanoparticles, which may in turn, limit side effects of the therapy and limit exposure to the nanoparticle.

Drug Delivery: Someone skilled in the art of drug delivery may take advantage of the approach herein to add therapeutic-chemicals, -biomacromolecules, -drugs, -performance enhancers, -vitamins, and -biocompatible components to the chemical interface of the gradient nanoparticles. It is envisaged that those skilled in the art will take advantage of the superior magnetic and corrosion resistant properties of the gradient nanoparticle to magnetically guide the 'drug'-modified gradient nanoparticles to a region of interest (i.e., tumor) where the drug can be released by passive diffusion, and built in release mechanism, or heat generated by a oscillating magnetic field, as described herein. Due to the size of the gradient nanoparticles being tunable, those skilled in the art will be able to design delivery, and temperature gradients, specific to the field of use.

Medical Therapies. Someone skilled in medical treatment via magnetic hyperthermia will take advantage of the magnetic and corrosion-resistant properties of the gradient nanoparticles for therapy, such as heating active tumors. In this embodiment, those skilled in the art will take advantage of the approaches described herein to deliver (or guide) the gradient nanoparticle to a tumor site and heat the tumor via an magnetic field. Due to the stable nature of the gradient nanoparticle, the magnetic properties (susceptibility, strength) will not change over the course of the treatment, allowing clinicians to use lower concentrations of the nanoparticles, which may in turn, limit side effects of the therapy and limit exposure to the nanoparticle. Moreover, because the magnetic strength generated by the gradient nanoparticles is many times higher than typical materials like iron-oxide particles, increased temperatures can be generated, further decreasing treatment times and visits, as well as increase the local efficacy.

Augmented Tumor Surgery. Someone skilled in the art of tumor surgery can visualize the tumors sites by combining the approached herein with magnetic imaging, or by further incorporating a luminescent metal, ion, biomolecule, or molecule to the gradient nanoparticle interface. In this embodiment, those skilled in the art will take advantage of the gradient's magnetic properties, corrosion resistance, and composition functionality to incorporate luminescent ions, such as gallium or other lanthanides into ceramic or oxide layers at the outer periphery of the particle, thus imparting a luminescence to the gradient nanoparticle. In other embodiments, the approaches herein will be used to modify the interface with fluorescent molecules, or bioluminescent enzymes or proteins. These light sources can thus be activated after the delivery of the gradient to the tumor sites by the clinician.

Battery components. Someone skilled in the art of battery construction and electrode design can take advantage of the corrosion resistant properties of the gradient nanoparticles while also taking advantage of the particles rich in void concentration for improved lithium or sodium intercalation, battery stability towards long term cycling, and increased storage densities. It is envisaged that those skilled will utilize said gradient nanoparticles that posses high void concentrations and anion rich surfaces to promote stable lithium- or sodium-ion intercalation. Furthermore, it is envisaged that gradient nanoparticles that are both conductive, but also possess oxide or sulfide rich gradients will provide greatest opportunity.

Fuel cell components. Someone skilled in the art of fuel cell construction, electrode design, and catalyst preparation may take advantage of gradient design and composition to produce a nanoparticles that act or protect the main electrodes or electronics from corrosion, but also produces catalysts consisting a corrosion resistant inner gradient followed by ceramic or oxide rich layer, and terminated with thin gradients rich in noble metals. It is envisaged that such catalysts will reduce catalyst costs while increasing efficiency by proving a cost effective and conductive inner gradient, and active oxide layer, and small but active amount of noble metal, such as; platinum, palladium, silver, gold, or said noble metals in alloy forms combined with nickel, vanadium, iron, copper, cobalt, chromium, or vanadium. It is further envisaged that those skilled in the art will combine said gradient nanoparticles with conductive supports, such as carbon (carbon black, HOPG, etc.) and it's polymorphs and nano-forms (graphene, C60, nanotubes, etc.), and that additional thermal annealing of the gradients at elevated temperatures, varied atmospheres, and varied pressures will be performed, and that the final products will be combined with ion conductive polymers in final fuel cell constructions.

Gas Storage and Remediation. Someone skilled in the art of gas storage and remediation (catalytic processes) may take advantage of a gradient nanoparticle with; high void concentrations, specific void sizes, and specific void interface reactivity (metal sites), to collect, absorb, or convert gases rich in oxygen, sulfur or nitrogen. It is envisaged that said gradients could be combined with solid supports, liquids, ionic liquids, and other devices to absorb gases emitted from refineries, power plants, automobile and other transportation exhausts. Further, the gradients can be further used as gas scrubbers to remove/convert said contaminants or others in living areas like those found in medical centers, hospital rooms, aircraft, maritime vessels, and spacecraft, as further described herein.

Heterogeneous catalysis. Someone skilled in the art of heterogeneous catalysis; may take advantage of a gradient nanoparticle whose composition is stable to high temperatures and whose outer gradient has a composition rich in particular oxides or ceramics and is when needed terminated by gradient rich in noble metals or other metals that either cover, or partially cover the ceramic interface. It is envisaged that said gradients could be used in; automobile catalytic converts and exhaust management devices/programs, conversion or remediation of toxic gases. It is further envisaged that said nanoparticles could be prepared as coatings, films, patterns, and sprays like that described in herein, or on supports, such as described herein.

Lubrication. Someone skilled in the art of lubrication may take advantage of the high temperature stability of the gradient particles as additives for dry and liquid lubrications. In this embodiment the gradient will consist of a high temperature corrosion resistant inner gradients and will be terminated with increasing concentrations of metal-oxides or metal-sulfides, and will reduce wear by movement of the gradient nanoparticles within the film, and also the molecular layers within gradients. The gradient lubricant can be deposited before assembly as films using technologies like that described herein or deposited/re-deposited by adding said lubricant as an additive to existing oils and liquid lubricants.

Carbon Composites. Someone skilled in the art of constructing carbon composites, such as carbon fiber, can take advantage of solution processability of the gradient nanoparticles to infuse composites with specific concentrations of metals, thereby endowing the composite with new or improved properties; such as, mechanical wear, magnetism, corrosion resistance, electromagnetic absorption, conductivity, reflectance, strength. The gradient nanoparticle can be either be deposited before and after graphitization of carbon, or infused by using as an additive to epoxy hardener.

Steel. Someone skilled in the art of creating and processing steel can take advantage of the composition control, corrosion resistance, and nano size of the gradient nanoparticles to create steel coatings, wires, films, and patterns. Steel coatings will be prepared by depositing thin films, where thicknesses are between 1-1000 nanometers of the gradient nanoparticles followed by heating to temperatures of >200° C. in various atmospheric conditions to create continuous steel layers. Similar approaches can be used to make thin wires (deposited gradients into molds), and patterns (where pattern dimensions can range from nano- to micro-meter dimensions). It is envisaged that those skilled in the art can prepare gradients of all common steel compositions and grades, and defined by the AISI/SAE organizations, namely; 10XX, 11XX, 12XX, 13XX, 23XX, 25XX, 31XX, 32XX, 33XX, 34XX, 40XX, 44XX, 41XX, 43XX, 47XX, 46XX, 48XX, 50XX, 51XX, 50XXX, 51XXX, 52XXX, 61XX, 72XX, 81XX, 86XX, 87XX, 88XX, 92XX, 93XX, 94XX, 97XX, 98XX. Where the host gradient (high concentration) is metallic iron, the first two numbers are Nickel-Chromium-Molybdenum concentrations, and the "XX" correspond to carbon concentrations. Moreover, those skills in the field will take advantage of the nanoscale dimensions of the gradients to process such steels at temperatures much lower than those typically required to craft steel. It is further envisaged that different classes of stainless steel can be imparted in different regions of the nanoparticle gradient, and those regions may also contain functional voids.

Steel Management and Preparation. Someone skilled in the art of crafting steel uses the gradient nanoparticles to induce phase changes, reduce or create grain boundaries, induce or control precipitation, and improve processing. Unlike other embodiments herein, those skilled in the art will take advantage of the gradient nanoparticles as additives to manipulate bulk steel processing. In addition to promoting corrosion resistance as described herein, and preparation of steel films, wires, and patterns herein, the composition of the gradient nanoparticles and their size, size ratios, concentrations control will be used to; refine the microstructure of steel, and the incorporation of metals and ceramics that otherwise cannot be easily integrated (including carbides, intermetallics, carbonitrides, and nitrides, sulfides, phosphides, oxides, and ceramics). It is further envisaged that final processing of bulk steel with the nanoparticle gradients will passivate large grain boundaries, extended defects, and interfaces during the processing. It is envisaged that the gradient nanoparticles can be combined during the steel smelting, or added to it's interface during cooling, or added as a final step to the cooled and forged steel, allowing for rapid compositional changes, or added after the final cooling of the bulk steel followed by additional annealing steps like those described herein. It is envisaged that changes to the steels corrosion resistance, toughness, yield strength, ductility, abrasion resistance, and magnetic properties will be tailored in this manner.

Stainless Steels: Someone skilled in the art of crafting stainless steel uses the gradient nanoparticles to prepare stainless steel coatings, thin films, wires, patterns and additives. Like that described herein, the Stainless Steel coatings will be prepared by depositing thin films, where thicknesses are between 1-1000 nanometers of the gradient nanoparticles followed by heating to temperatures of >200° C. in various atmospheric conditions to create continuous steel layers. Similar approaches can be used to make thin wires (deposited gradients into molds), and patterns (where pattern dimensions can range from nano- to micro-meter dimensions). It is envisaged that those skilled in the art can prepare all stainless steel grades, as defined by the SAE as: J405, 904L, 440F, 440C, 440B, 440A, 430, 410, 409, 32iH, 321, 317L, 316Ti, 316LN, 316L, 316, 312, 310S, 310, 305, 304LN, 304L, 304H, 301LN, 301, 254SMO, 2304, 2205, or other 200-, 300-, and 400-series forms that include Austenitic-Superaustenitic-, Ferritic-, Matensitic-, and Duplex-steels or combinations thereof. It is further envisaged that different classes of stainless steel can be imparted in different regions of the nanoparticle gradient, and those regions may also contain functional voids. Moreover, those skills in the field will take advantage of the nanoscale dimensions of the gradients to process such steels at temperatures much lower than those typically required to craft steel.

Medical Alloys. Someone skilled in the art of crafting and implementing medical alloys may take advantage of the gradient nanoparticles to prepare stable metal coatings and films that are composed of alloys commonly referred to as medical alloy compositions, which aluminum, chromium, cobalt, molybedum, vanadium and titanium. It is envisaged that gradient nanoparticles with Grade 5—like titanium alloys (Ti6Al4V, Ti-6Al-4V, Ti6-4) can be constructed in which the nanoparticle retains its magnetic and corrosion resistant properties but is imparted with the properties commonly found in Grade-5, such as biocompatibility, strength, and corrosion resistance in biological environments, solutions and interfaces. It is further envisaged that coatings, films, and patterns of medical alloys can be deposited onto; other metals, plastics, ceramics, implants, devices, and surgical tools by following the procedures discussed herein.

Titanium Alloys. Someone skilled in the art of crafting titanium may take advantage of the gradient nanoparticle to prepare nanoparticles with titanium rich gradients, circumventing the need to produce a wholly titanium particle. It is envisaged that careful selection of the gradient will allow titanium rich gradients to be formed, and subsequent alloys in a similar manner. These alloys can then be used in embodiments similar to those herein. It is further envisaged that the titanium rich gradient nanoparticles can be used to craft thin films, coatings, wires, and patters in ways similar to that described herein.

Aluminum Alloys. Someone skilled in the art of crafting aluminum may take advantage of the gradient nanoparticle to prepare nanoparticles with aluminum rich gradients, like that of titanium envisaged herein.

Magnetic Refrigeration. Someone skilled in the art of magnetic refrigeration uses gradient nanoparticles as the magnetic components in refrigeration by taking advantage of the low coercitivity, high magnetic moment, and high stability of the gradient nanoparticles. It is envisaged that gradient nanoparticles rich in iron cobalt and nickel whose interface is stainless, will have high performance in magnetic refrigeration, wherein rapid switching of high magnetic fields is a necessity to improve efficiency.

Propulsion. Someone skilled in the art of crafting propulsion components uses the gradient nanoparticles as energy sources for thrust. In this embodiment, the gradient nanoparticle would be made of materials with high energy density that are known to promote combustion.

Ballistics. Someone skilled in the art of ballistics uses the gradient nanoparticles as high stable and compact source of combustible energy. The ballistics can be prepared as thin-films, powders, or additives of existing technologies. It is envisaged that such gradients will be rich in metallic iron, carbon, magnesium, or aluminum.

Life Sciences. Someone skilled in the general art of life-sciences used the gradient nanoparticles as highly stable magnetic supports. It is envisaged that the properties described herein will be used to separate, collect, or process biomolecules, biomacromolecules, proteins, enzymes, antibodies, small molecules, conjugates, self-assembled structures, and drugs by attaching said molecules to the gradient nanoparticles interface followed by separation via a magnetic field supplied by a strong portable magnet. Here those skilled in the art may take advantage of the nano size of the gradients, their strong magnetic properties, and the functionality to separate with high efficiency.

Life Sciences. Someone skilled in the general art of life sciences uses the gradient nanoparticles as highly stable magnetic supports, also known as magnetic beads. It is envisaged that the gradient nanoparticle properties, and magnetic bead studies (FIGS. 26-27) described herein, can be further refined in order to better separate, collect, or process biomolecules, biomacromolecules (DNA, RNA, etc.), proteins, enzymes, exosomes, antibodies, small molecules, conjugates, self-assembled structures, and or drugs. In those methods, those skilled in the art of immunoprecipitation, will attach said molecules, or high affinity chemical groups, via standard methods, to the gradient nanoparticles inorganic or organic interface. The magnetic properties of the gradient nanoparticles would then allow for rapid separation via a magnetic field supplied by a magnetic field. Here those skilled in the art may take advantage of the nano size of the gradients, the stability of the interface, the composition and size dependence of the magnetic properties, as a way to separate with high efficiency and selectivity, especially targets whose size is comparable to the gradient nanoparticle.

Environmental Remediation. Someone skilled in the general art of environmental remediation uses the gradient nanoparticles magnetic properties to collect toxins from soil, water bodies, buildings, air, or surfaces. Using the embodiments described herein those skilled in the art can modify the interface of the gradients to absorb said toxins followed by collection via magnetic field. It is envisaged that the added corrosion resistance, magnetic stability, and strong magnetic properties of the gradients will allow for increased recyclability of the materials, allowing for the same materials to collect multiple times.

Ferrofluids. Someone skilled in the art of creating and using ferrofluids uses the gradient nanoparticles as additives of said fluids and other components. Using the properties described herein it is envisaged that the gradient nanoparticles can be dispersed in solvents at high concentrations upon which the viscosity of the solution can be tailored via applied magnetic field. It is envisaged that those skilled in the art will use the strong magnetic properties and low coercivity of the gradient nanoparticles to prepare increasing smaller and more responsive ferrofluid components, such as active shock absorbers, seals, active lubrication, optics, heat transfer, and propulsion.

Conductive Surfaces. Someone skilled in the art of creating conductive surfaces uses gradient nanoparticles as precursors to making such surfaces. Thin films, coatings, or patterns of gradient nanoparticles can be formed and then heated (via a furnace, laser, etc.) in order to sinter the gradients nanoparticles into continuous metals. Here it is envisaged that the composition, corrosion resistance, and processability of the gradients will be beneficial as compared to conventional technologies and approaches.

Aerogels. Someone skilled in the art of creating metallic aerogels or metal foams uses gradient nanoparticles as the metallic precursor. Owing to the nature of it's interface, it is envisaged that the gradient nanoparticles can be dissolved in supercritical solvents with ease, and combined with additional components as necessary. Once formed via evaporation of the supercritical chemical, the gradient nanoparticles will be interconnected and can be further processed via steps from those arts. In this embodiment it is expected that the stainless properties of the gradients will improve the long term performance of the aerogels, the nano size will lead to new interconnected microstructures, and gradient nanoparticles with high concentrations of voids will decrease weight, increase surface area, and also increase reactivity of aerogels where needed.

3D Printing. Someone skilled in the art of 3D printing plastics, metals, or other materials can take advantage of the gradient nanoparticles to impart metallic, magnetic, or stainless properties into or onto 3D printed objects. Owing to the nature of the properties, size, and processability of the gradient nanoparticles, it is envisaged that they can be infused into 3D printing filaments, allowing for the direct printing of metal rich objects. It is further envisaged that the printed 3D objects could be spray coated with a final coating of gradient nanoparticles to improve, protect, or decorate the object. It is finally envisaged that metal 3D printing and laser printing can further take advantage of gradient nanoparticles as a metal writing source, or by using films of gradients that can be laser engraved, which would allow for conductive patterns to be created.

Rare Earth Magnets. Someone skilled in the art of crafting rare earth magnets, or similar materials can take advantage of the gradient nanoparticle approach to either craft nanoscale magnets, or protect bulk magnets from corrosion. Owing to the nature of the gradient technology and its corrosion resistance, it is envisaged that the nanoscale magnets would have strong magnetic properties and high susceptibility. Moreover, as films and coatings, the gradients can be used a cost effective and space/weight saving solution to coat or modify bulk magnets, such as those found in wind turbines, hybrid electric vehicles and electric vehicles. The coatings would extend the lifespan of the magnets, especially when operated in humid or salt rich environments. The coating could be either functional to the magnet itself, such as reducing Nd-hydroxide formation, bonding or filling cracks and grain boundaries, or passivate impurities (such as Nd or Fe filings produced during manufacture). Such coatings could be used to replace current technologies, such as nickel-copper-nickel plating or epoxy/organic coatings, thus reducing protective layer thickness and cost.

Microfluidics. Someone skilled in the art of microfluidics design and usage can take advantage of the high compositional stability, as well as the controlled colloidal stability of gradient nanoparticles for use inside microfluidic channels. Here, the channels, reservoirs, and mixing chambers of the microfluidic can be designed in such a way as to optimize flow of the magnetic gradient nanoparticle continuously, as well as to use the gradient nanoparticle to perform magnetically induced; channel blockage, pumping, mixing, immunoprecipitation, analysis, diagnostics, or delivery. It is envisaged that each microfluidic device would employ multiple gradient nanoparticle variations in tandem, and may take further advantage of the composition and size dependence magnetic properties to tune response.

Anti-Counterfeit Technologies. Someone skilled in the art of designing and producing anti-counterfeit materials and devices can take advantage of the colloidal nature, high and addressable magnetism, ease of embedding into plastics, and high EMI absorption properties to of the gradient nanoparticles to prepare security inks, radio-frequency identification (RFID) tags, and other addressable magnetic devices. It is envisaged that different printed patterns, 3D features, or alternating layers, of gradient nanoparticles can be easily crafted, printed, patterned, or machined, allowing for tunable electromagnetic absorption characteristics not currently available. In addition to such features, multiple versions, compositions, sizes, and formulations of gradient nanoparticles can be used simultaneously to further craft magnetic response. Further, it is envisaged that said gradient nanoparticles can be combined with additional nanomaterials (metallic, ceramic, semiconductive), polymers (conductive and non-conductive) and surfaces (glasses, metals, ceramics, semiconductors) to alter conductivity or further refined antennae characteristics.

What is claimed is:

1. A nanoparticle, comprising:
   a metallic center formed from at least a first metal comprising iron;
   an interface formed from at least a second metal, wherein the second metal is selected from the group consisting of nickel, chromium, cobalt, molybdenum, tungsten, vanadium, aluminum, and titanium, and combinations thereof; and
   a gradient between the metallic center and the interface that transitions from a first concentration of the second metal to a second, higher concentration of the second metal radially outward from the metallic center.

2. The nanoparticle of claim 1, further comprising a void within the gradient.

3. The nanoparticle of claim 2, wherein the nanoparticle is magnetic.

4. The nanoparticle of claim 2, wherein the nanoparticle is conductive.

5. The nanoparticle of claim 2, wherein the nanoparticle is at least partially oxidized.

6. The nanoparticle of claim 5, wherein the nanoparticle has been modified with one or more inorganic or organic compounds.

7. A device comprising a plurality of nanoparticles, wherein each nanoparticle comprises a metallic center formed from at least a first metal comprising iron an interface formed from at least a second metal selected from the group consisting of nickel, chromium, cobalt, molybdenum, tungsten, vanadium, aluminum, and titanium, and combinations thereof, and a gradient between the metallic center and the interface that transitions from a first concentration of the second metal to a second, higher concentration of the second metal, wherein the plurality of nanoparticles are applied as a coating to a substrate and the coating protects the substrate from corrosion.

8. The device of claim 7, wherein the coating is magnetic, conductive, catalytic, or combinations thereof.

9. The device of claim 7, wherein the plurality of nanoparticles are embedded in a polymer or composite.

10. A device comprising a plurality of nanoparticles, wherein each nanoparticle comprises a metallic center formed from at least a first metal comprising iron, an interface formed from at least a second metal selected from the group consisting of nickel, chromium, cobalt, molybdenum, tungsten, vanadium, aluminum, and titanium, and combinations thereof, and a gradient between the metallic center and the interface that transitions from a first concentration of the second metal to a second, higher concentration of the second metal, wherein the nanoparticles function as magnetic bead supports.

* * * * *